(12) United States Patent
Berkovitch et al.

(10) Patent No.: US 8,209,126 B2
(45) Date of Patent: Jun. 26, 2012

(54) WAVEFRONT-DEFINED RADON TRANSFORM

(75) Inventors: Alexander Berkovitch, Barkan (IL); Igor Belfer, Bat-Yam (IL); Roman Kazinnik, Givatayim (IL)

(73) Assignee: Geomage (2003) Ltd., Modi'in (IL)

( * ) Notice: Subject to any disclaimer, the term of this patent is extended or adjusted under 35 U.S.C. 154(b) by 1105 days.

(21) Appl. No.: 12/080,218

(22) Filed: Apr. 1, 2008

(65) Prior Publication Data

US 2009/0248313 A1    Oct. 1, 2009

(51) Int. Cl.
  *G01V 1/00* (2006.01)
  *G01V 1/28* (2006.01)
(52) U.S. Cl. ............... 702/16; 702/11; 702/14; 702/17
(58) Field of Classification Search ............ 702/5, 6–18, 702/671; 367/37, 38, 40
  See application file for complete search history.

(56) References Cited

U.S. PATENT DOCUMENTS

| | | | |
|---|---|---|---|
| 4,760,563 A | 7/1988 | Beylkin | |
| 4,878,205 A | 10/1989 | Gelshinsky | |
| 4,935,905 A | 6/1990 | Gassaway | |
| 5,103,429 A | 4/1992 | Gelshinsky | |
| 5,331,604 A * | 7/1994 | Chang et al. | 367/31 |
| 5,563,949 A | 10/1996 | Bahorich et al. | |
| 5,724,309 A | 3/1998 | Higgs et al. | |
| 5,831,935 A | 11/1998 | Luo et al. | |
| 5,892,732 A | 4/1999 | Gersztenkorn | |
| 5,920,828 A | 7/1999 | Norris et al. | |
| 5,987,388 A | 11/1999 | Crawford et al. | |
| 6,018,498 A | 1/2000 | Neff et al. | |
| 6,263,284 B1 | 7/2001 | Crider et al. | |
| 6,636,809 B1 | 10/2003 | Herrmann | |
| 6,832,161 B1 | 12/2004 | Moore | |
| 6,904,368 B2 * | 6/2005 | Reshef et al. | 702/17 |
| 6,989,841 B2 * | 1/2006 | Docherty | 345/629 |
| 7,069,149 B2 | 6/2006 | Goff et al. | |
| 7,085,195 B2 | 8/2006 | Taner et al. | |

(Continued)

FOREIGN PATENT DOCUMENTS

EP    0619887 B1    1/2000

(Continued)

OTHER PUBLICATIONS

Berkovitch, The Multifocusing Method for Homeomorphic Imaging and Stacking of Seismic Data, 1995.*

(Continued)

*Primary Examiner* — Sujoy Kundu
*Assistant Examiner* — Michael Dalbo
(74) *Attorney, Agent, or Firm* — Husch Blackwell LLP

(57) ABSTRACT

A computer-implemented method for processing data includes accepting a first collection of traces corresponding to signals received over time due to reflection of seismic waves from subsurface structures. A Radon transform is defined with respect to a set of wavefront parameters of the seismic waves. The transform defines a summation of amplitudes of the seismic waves over trajectories defined by the wavefront parameters.

The Radon transform is applied to the first collection of traces, so as to convert the first collection into a multidimensional data array that is defined as a function of at least two of the wavefront parameters. The multidimensional data array is processed to produce a second collection of traces having an improved imaging quality with respect to the first collection. The second collection of traces is processed to generate a seismic image of the subsurface structures at the improved imaging quality.

42 Claims, 13 Drawing Sheets

U.S. PATENT DOCUMENTS

| | | | | |
|---|---|---|---|---|
| 2003/0018436 | A1* | 1/2003 | Stark | 702/14 |
| 2003/0220744 | A1* | 11/2003 | Schonewille | 702/14 |
| 2004/0049349 | A1* | 3/2004 | Wood | 702/17 |
| 2005/0222774 | A1 | 10/2005 | Dulac et al. | |
| 2006/0155476 | A1 | 7/2006 | Abma | |
| 2006/0155477 | A1 | 7/2006 | Matson et al. | |
| 2006/0220744 | A1* | 10/2006 | Wong et al. | 330/295 |
| 2007/0131411 | A1 | 6/2007 | Vinegar et al. | |
| 2009/0067287 | A1 | 3/2009 | Berkovitch et al. | |

FOREIGN PATENT DOCUMENTS

| | | |
|---|---|---|
| EP | 1563324 B1 | 8/2006 |
| WO | 2008111037 A2 | 9/2008 |
| WO | 2009034567 A2 | 3/2009 |

OTHER PUBLICATIONS

International Application PCT/IL2008/001147 Search Report dated Feb. 9, 2009.

U.S. Appl. No. 11/900,243 Official Action dated Mar. 18, 2009.

Chira Oliva et al., "2-D ZO CRS Stack by Considering an Acquisition Line with Smooth Topography", Revista Brasiliera de Geofisica 23 (1), pp. 15-25, Sociedade Brasiliera de Geophysica, 2005.

Hertweck et al., "Data Stacking Beyond CMP", The Leading Edge, pp. 818-827, Jul. 2007.

Rupert et al., "The block move sum normal moveout correction", Geophysics, vol. 40, No. 1, pp. 17-24, Society of Exploration Geophysicists Feb. 1975.

Yilmaz, O., "The Radon Transform", pp. 938-948, Seismic Data Analysis, Society of Exploration Geophysics, 1987.

Eric De Bazelaire, "Normal moveout revisited: Inhomogeneous media and curved interfaces", Geophysics, vol. 53, No. 2, No. 2, pp. 143-157, Society of Exploration Geophysicists, Feb. 1988.

Yilmaz, O., "Velocity-stack processing", Geophysical prospecting, edition 37, pp. 351-382, 1989.

Byun et al., "Anisotropic velocity analysis for lithology discrimination", Geophysics, vol. 54, No. 12, pp. 1564-1574, Society of Exploration Geophysicists, Dec. 1989.

Gidlow et al., "Preserving far offset seismic data using non-hyperbolic moveout correction", Expanded Abstracts of 60th Annual International Meeting of Society of Exploration Geophysicists, pp. 1726-1729, San Francisco, USA, 1990.

Tsvankin et al., "Non-hyperbolic reflection moveout in anisotropic media", Geophysics, vol. 59, No. 8, pp. 1290-1304, Society of Exploration Geophysicists, Aug. 1994.

Shatilo et al., "Constant normal-moveout (CNMO) correction. A technique and test results", Geophysics Prospecting, vol. 48, pp. 473-388, European Association of Geoscientists & Engineers, 2000.

Hicks, G.J., "Removing NMO stretch using the radon and fourier-radon transforms", EAGE 63rd Conference & Technical Exhibition, A18, Amsterdam, The Netherlands, Jun. 11-15, 2001.

Berkovitch et al., Basic formula for multifocusing stack', EAEG 56th Meeting & Technical Exhibition, Vienna, Austria, Jun. 6-10, 1994.

Berkovitch, A., "The multifocusing method for homeomorphic imaging and stacking seismic data", Doctoral Thesis, Tel Aviv University, Oct. 1995.

Treitel et al., "Plane-Wave Decomposition of Seismograms", Geophysics, vol. 47, No. 10, pp. 1375-1401, Society of Exploration Geophysicists, Oct. 1982.

Thorson et al., "Velocity-Stack and Slant-Stack Stochastic Inversion", Geophysics, vol. 50, No. 12, pp. 2727-2741, Society of Exploration Geophysicists, Dec. 1985.

Foster et al., "Suppression of Multiple Reflections using the Radon Transform", Geophysics, vol. 57, No. 3, pp. 386-395, Society of Exploration Geophysicists, Mar. 1992.

Mitchell et al., "Efficient Tau-P Hyperbolic Velocity Filtering", Geophysics, vol. 55, No. 5, pp. 619-625, Society of Exploration Geophysicists, May 1990.

Hampson, Dan, "Inverse Velocity Stacking for Multiple Elimination", Journal of the Canadian Society of Exploration Geophysicists, vol. 22, No. 1, pp. 44-55, Dec. 1986.

Beylkin, Gregory, "Discrete Radon Transform", IEEE Transactions on Acoustics, Speech and Signal Processing, vol. ASSP-35, No. 2, pp. 162-172, Feb. 1987.

Trad et al., Accurate Interpolation with High-Resolution Time-Variant Radon Transforms', Geophysics, vol. 67, No. 2, pp. 644-656, Society of Exploration Geophysicists, Mar.-Apr. 2002.

Fomel, Sergey, "Least-Square Inversion with Inexact Adjoins. Method of Conjugate Directions: A Tutorial", Stanford Exploration Project (SEP) report SEP92, pp. 13-25, Nov. 9, 2000.

Hugonnet et al., "High Resolution Radon: a Review", IM2, EAGE 63rd Conference and Technical Exhibition, Amsterdam, The Netherlands, Jun. 11-15, 2001.

Thamban Nair et al., "The Trade-off Between Regularity and Stability in Tikhonov Regularization", Mathematics and Computation, vol. 66, No. 217, pp. 193-206, American Mathematical Society, Jan. 1997.

International Application PCT/IL2009/000201 "Wavefront-Defined Radon Transform" filed on Feb. 22, 2009.

International Application PCT/IL2009/000201 Search Report dated May 14, 2009.

International Application PCT/IL2007/000312 Search Report dated Sep. 10, 2008.

Taner et al., "Separation and imaging of seismic diffraction using plane-wave decomposition", pp. 2401-2405, International Exposition and 66th Annual Meeting, Society of Exploration Geophysicists, New Orleans, USA, Oct. 1-6, 2006.

Landa et al., "Seismic monitoring of diffracted images for detection of local heterogeneities", Geophysics, vol. 63, No. 3m pp. 1093-1100, Society of Exploration Geophysicists, May-Jun. 1998.

U.S. Appl. No. 12/526,630 Official Action dated Sep. 15, 2011.

U.S. Appl. No. 12/608,009 Official Action dated Sep. 13, 2011.

Russian Patent Application # 2010112964 Official Action dated Oct. 6, 2011.

Russian Patent Application # 2010135895 Official Action dated Oct. 6, 2011.

* cited by examiner

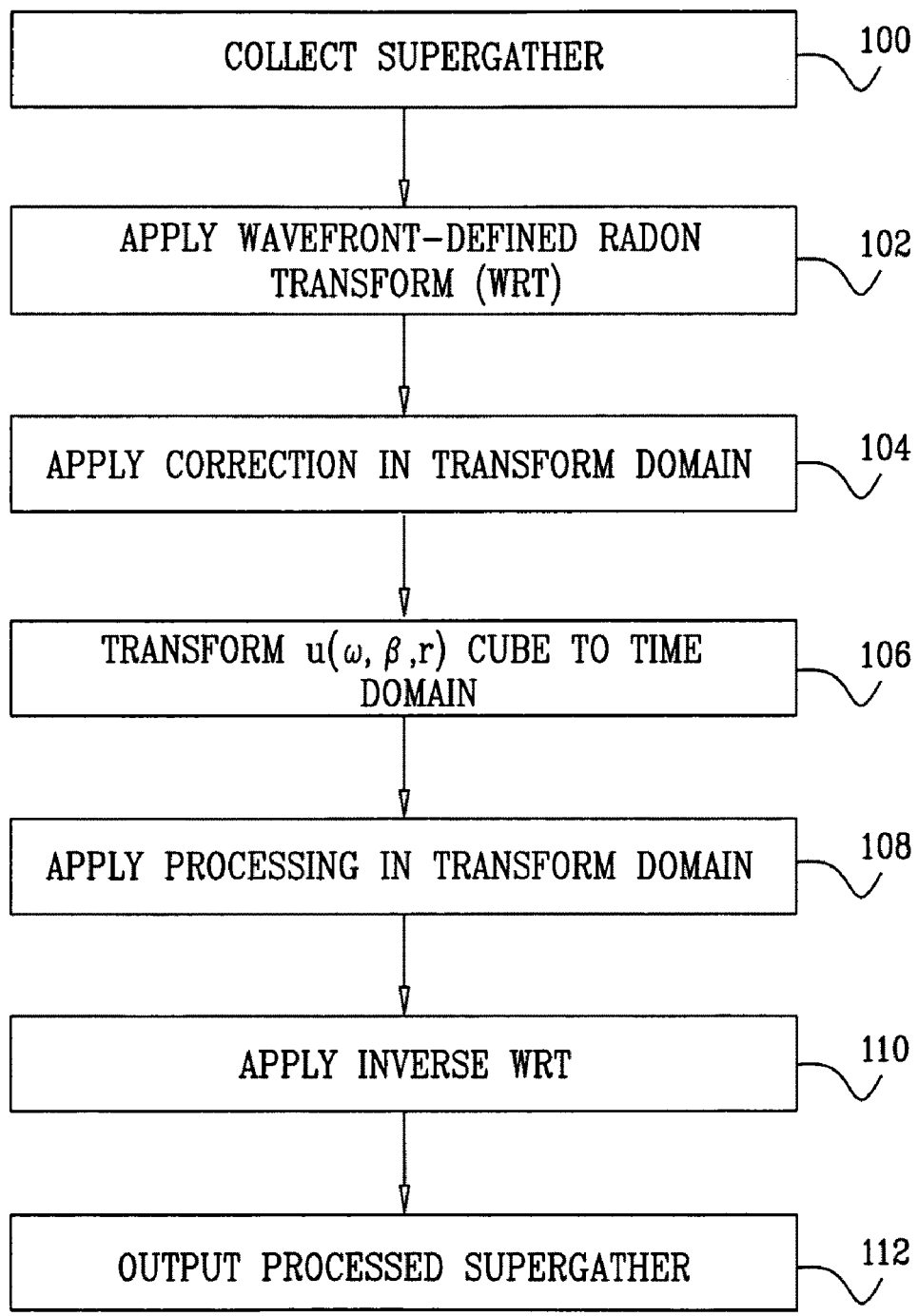

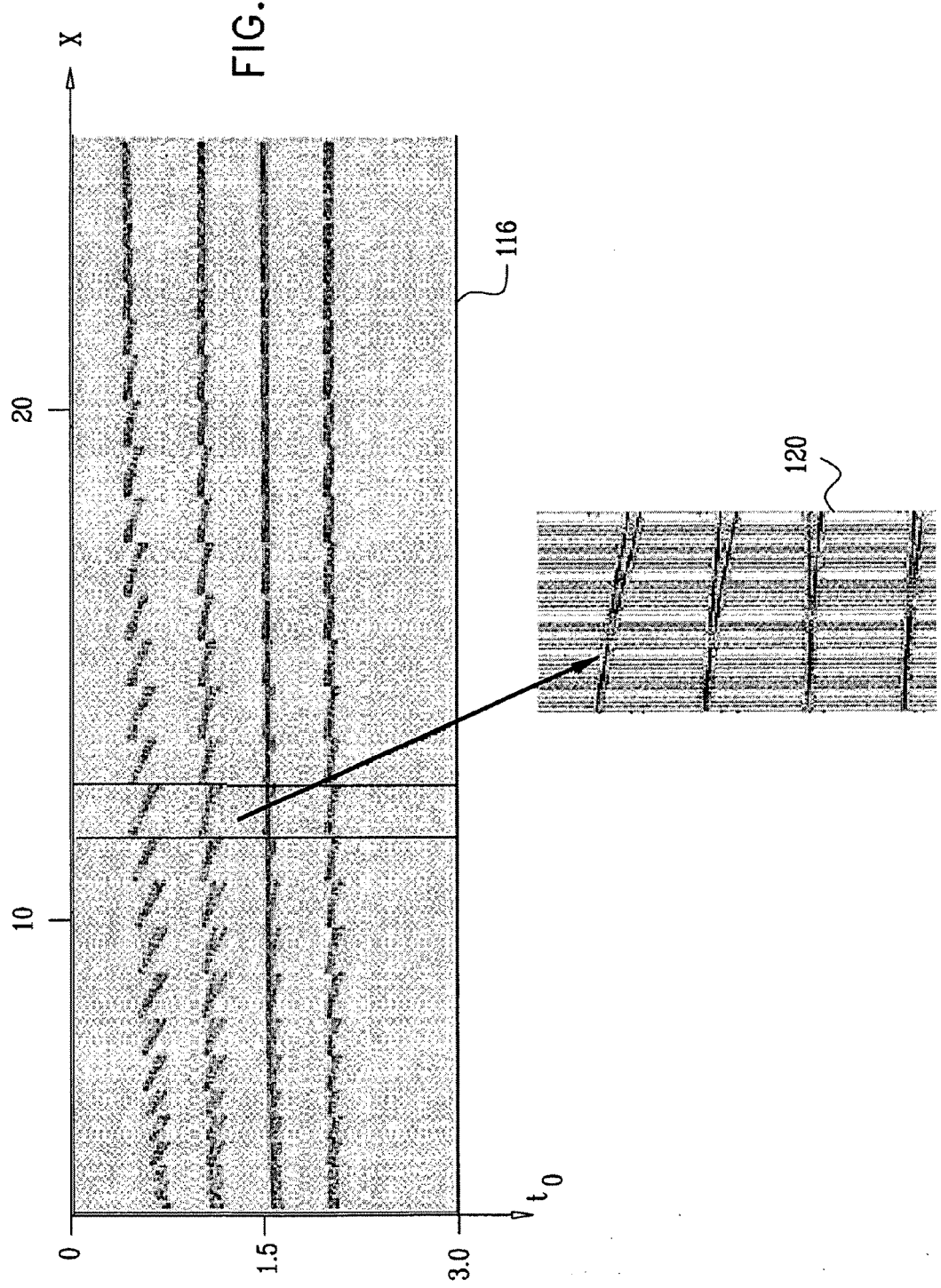

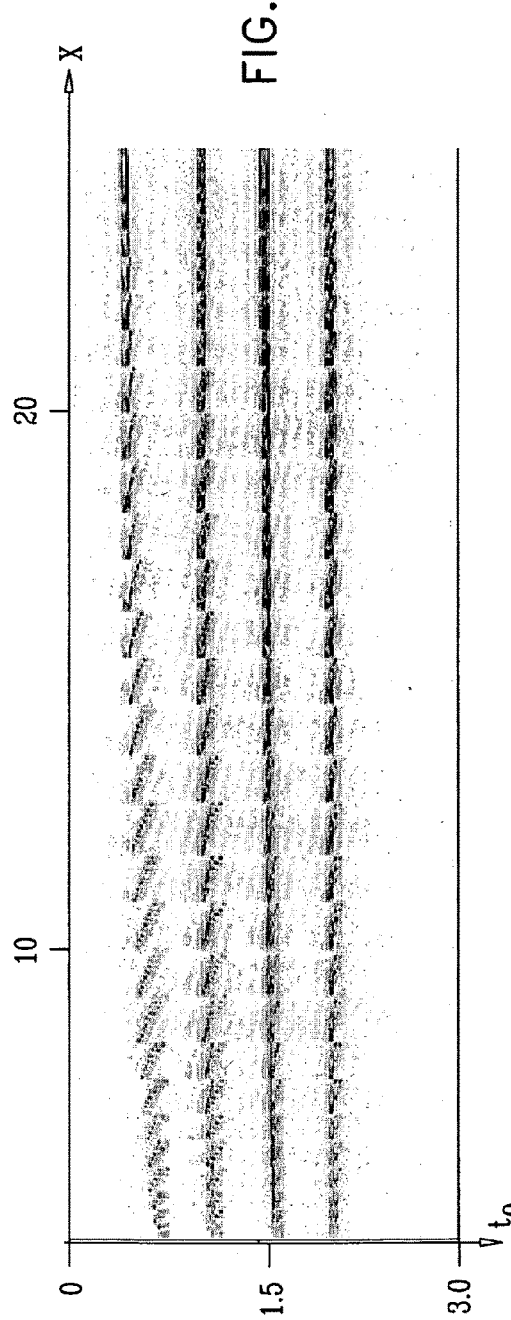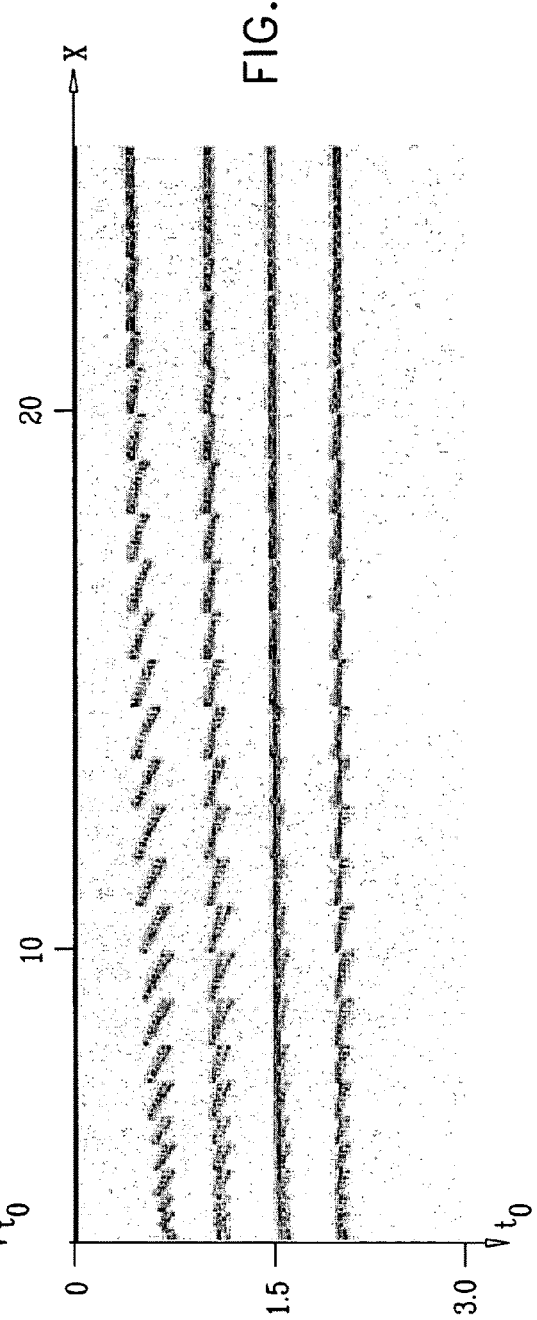

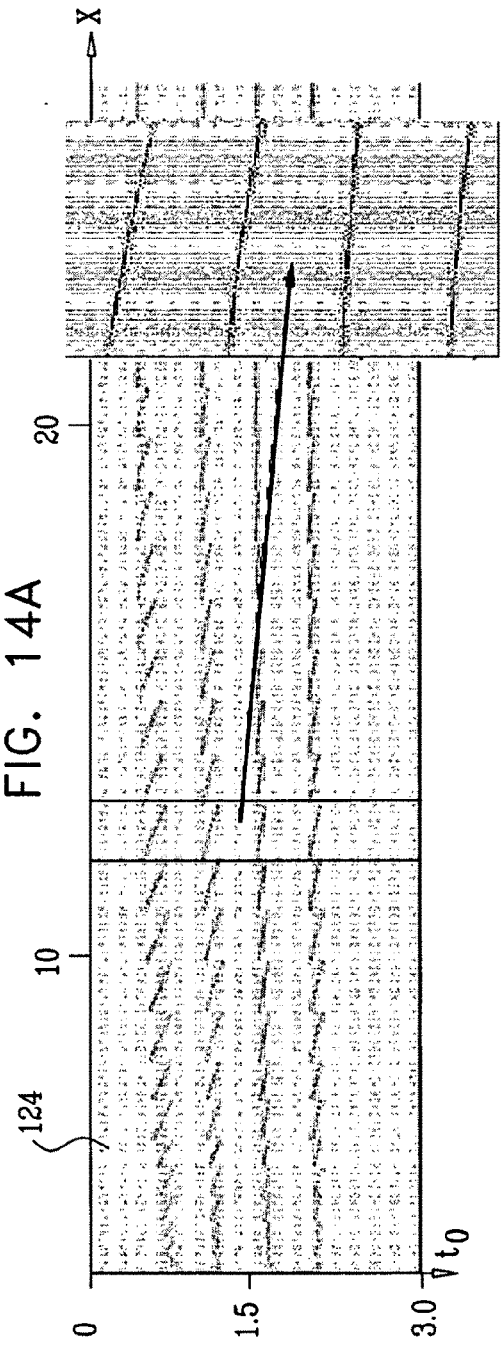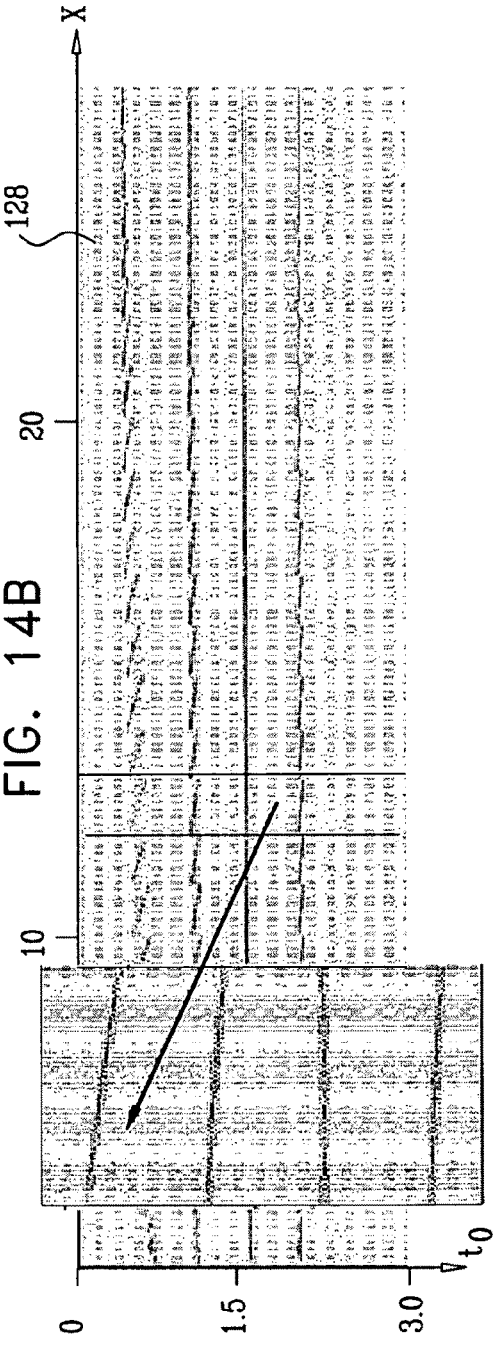

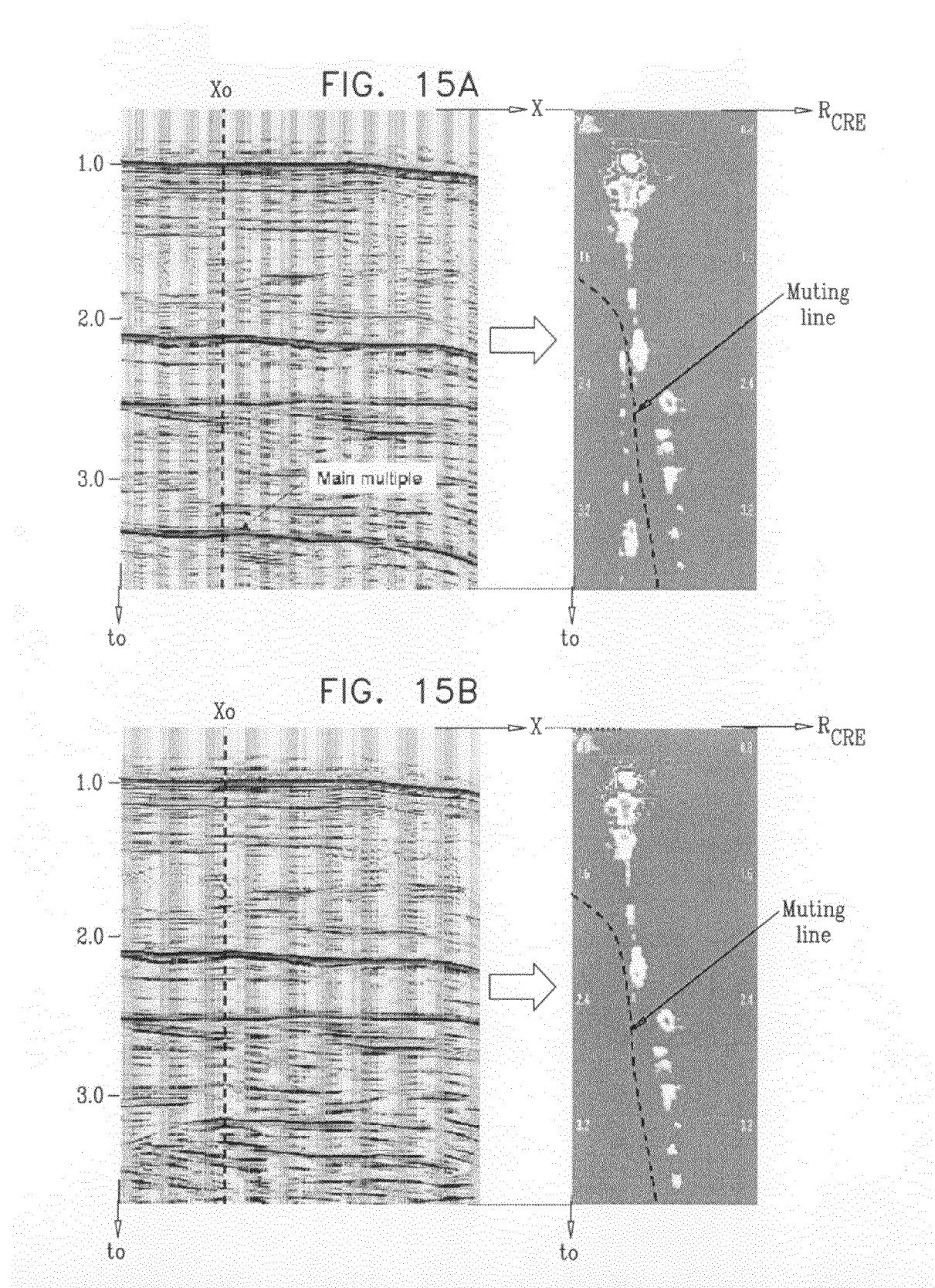

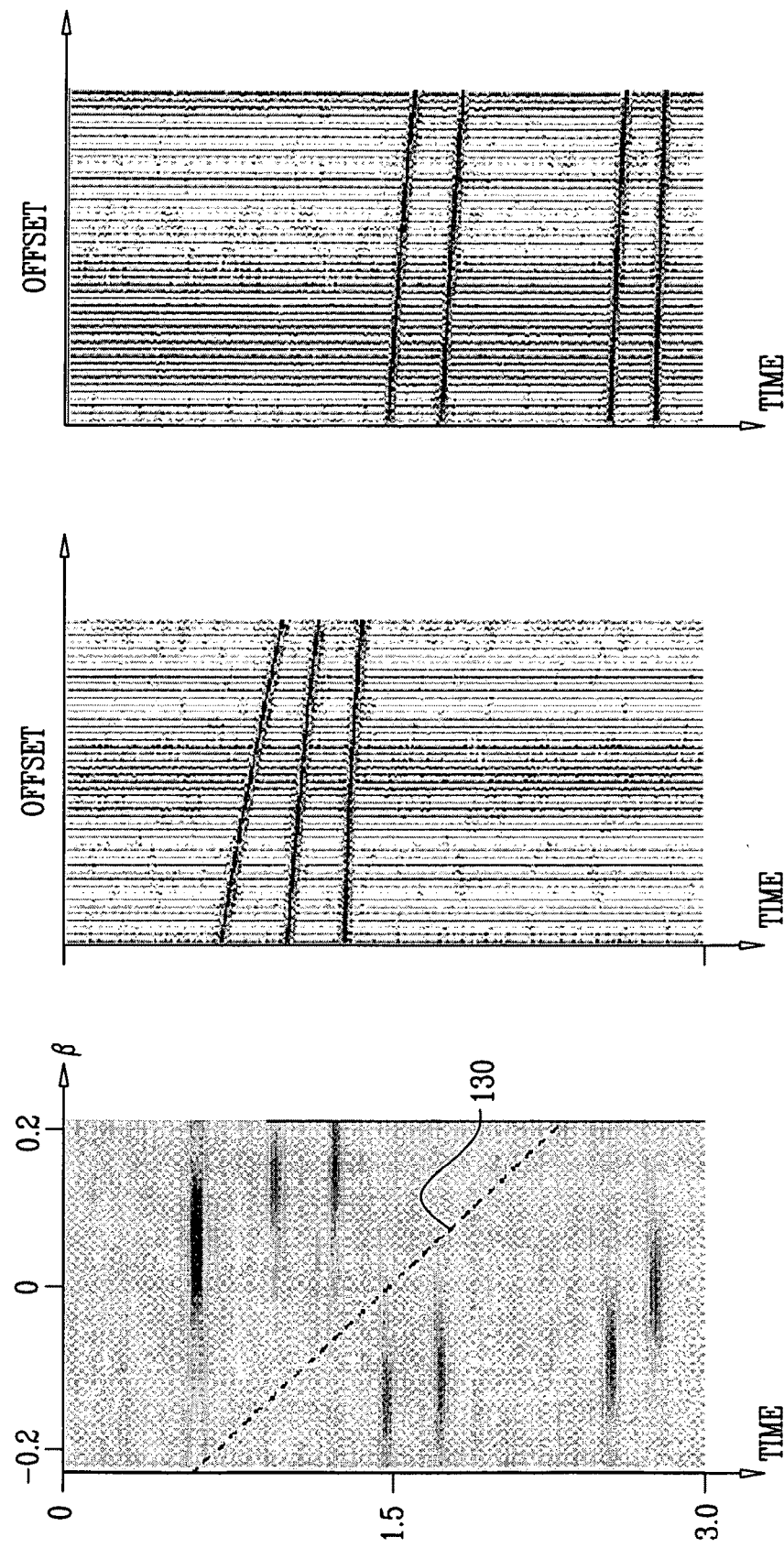

WAVEFRONT-DEFINED RADON TRANSFORM

FIELD OF THE INVENTION

The present invention relates generally to analyzing the structure of a medium, and specifically to processing of seismic data to analyze subterranean structures.

BACKGROUND OF THE INVENTION

Methods of seismic imaging that are known in the art use an array of seismic sources and receivers to acquire data regarding subsurface (i.e., subterranean) structures. Following a seismic stimulus (such as a detonation or mechanical shock) at a given source, each of the receivers produces a seismogram trace, i.e., a record of the seismic signal at the receiver as a function of time, due to reflections of the stimulus wave from the subsurface layers below the array. The traces from multiple receivers due to stimuli by sources at different locations are processed together in order to create an image of the layers.

As part of the imaging process, in order to increase signal/noise ratio, multiple traces from source/receiver pairs surrounding a common midpoint (CMP) are temporally aligned and then summed. (A group of traces of this sort is commonly referred to as a "gather," and the processes of aligning and summation the traces are known as normal moveout (NMO) correction and stacking.) The alignment is meant to take into account the differences in the travel times of seismic waves between different source/receiver pairs. The dependence of travel time is commonly assumed to be hyperbolic as a function of the distance between the source and receiver, and the time shift that is applied to align the traces in order to compensate for this hyperbolic dependence is calculated by a simple formula that includes the distance between source and receiver and the velocity of waves in the media.

The assumption of hyperbolic moveout, however, is known to be an inaccurate reflection of the actual characteristics of subterranean structures, and its application leads to loss of information. Consequently, a number of alternative approaches have been proposed to provide the correct alignment between gathers of traces. For example, U.S. Pat. No. 5,103,429, whose disclosure is incorporated herein by reference, describes a method for analyzing such structures using homeomorphic imaging. (In a homeomorphic image, each element of a target is mapped one-to-one to a corresponding element of its image, so that the target object and its image are topologically equivalent.) This method is said to allow many types of stacks and corresponding images to be constructed without loss of resolution.

The Radon transform is a well-known mathematical transform that is applied in various imaging applications. Several known methods use the Radon transform for analyzing seismic data. In particular, three variants of the Radon transform, namely the slant-stack, hyperbolic and parabolic Radon transforms, have been used for seismic data analysis. The slant-stack transform is described, for example, by Treitel et al., in "Plane-Wave Decomposition of Seismograms," Geophysics, volume 47, number 10, October, 1982, pages 1375-1401, which is incorporated herein by reference. The slant-stack transform is also addressed in U.S. Pat. No. 4,760,563, whose disclosure is incorporated herein by reference, and by Thorson and Claerbout in "Velocity-Stack and Slant-Stack Stochastic Inversion," Geophysics, volume 50, number 12, December, 1985, pages 2727-2741, which is incorporated herein by reference.

The hyperbolic and parabolic Radon transforms are described, for example, by Foster and Mosher in "Suppression of Multiple Reflections using the Radon Transform," Geophysics, volume 57, number 3, March, 1992, pages 386-395, which is incorporated herein by reference. The hyperbolic Radon transform is described, for example, by Mitchell and Kelamis in "Efficient Tau-P Hyperbolic Velocity Filtering," Geophysics, volume 55, number 5, May, 1990, pages 619-625, which is incorporated herein by reference. The parabolic transform is described, for example, by Hampson in "Inverse Velocity Stacking for Multiple Elimination," Journal of the Canadian Society of Exploration Geophysicists, volume 22, number 1, December, 1986, pages 44-55, which is incorporated herein by reference. A discrete Radon transform is described by Beylkin in "Discrete Radon Transform," IEEE Transactions on Acoustics, Speech and Signal Processing, volume ASSP-35, number 2, February, 1987, pages 162-172, which is incorporated herein by reference.

SUMMARY OF THE INVENTION

Embodiments of the present invention provide a computer-implemented method for processing data, including:

accepting a first collection of traces corresponding to signals received over time due to reflection of seismic waves from subsurface structures;

defining a Radon transform with respect to a set of wavefront parameters of the seismic waves, the transform defining a summation of amplitudes of the seismic waves over trajectories defined by the wavefront parameters;

applying the Radon transform to the first collection of traces, so as to convert the first collection into a multidimensional data array that is defined as a function of at least two of the wavefront parameters;

processing the multidimensional data array, so as to produce a second collection of traces having an improved imaging quality with respect to the first collection; and processing the second collection of traces to generate a seismic image of the subsurface structures at the improved imaging quality.

In some embodiments, applying the transform, processing the multidimensional data array and processing the second collection are performed irrespective of first locations at which the seismic waves were produced, of second locations at which the signals were received and of mid-points between the first and second locations.

In an embodiment, the multidimensional data array includes three or more dimensions corresponding to the at least two of the wavefront parameters and to a propagation time of the seismic waves. In a disclosed embodiment, the wavefront parameters include an angular parameter and at least one radius of curvature of a wavefront outgoing from a subsurface reflector. In an embodiment, the angular parameter includes an emergence angle, and the at least one radius of curvature includes respective radii of a common reflected element and a common evolute element of the wavefront.

In another embodiment, processing the multidimensional data array includes correcting distortion that is introduced into the multidimensional data array by application of the Radon transform. Correcting the distortion may include transforming the multidimensional data array to a frequency domain, and correcting the distortion in the frequency domain. Alternatively, correcting the distortion may include correcting the distortion in a time domain. In some embodiments, correcting the distortion includes applying an iterative correction process to the multidimensional data array.

In some embodiments, processing the multidimensional data array includes differentiating between first and second seismic events that are transformed to respective, different first and second locations in the multidimensional data array. Differentiating between the first and second seismic events may include muting one of the first and second locations in the multidimensional data array. In an embodiment, the first seismic event is caused by a single reflection and the second seismic event is caused by multiple reflections. Additionally or alternatively, differentiating between the first and second seismic events includes specifying the first and second locations in the multidimensional data array as a function of the at least two wavefront parameters.

In another embodiment, processing the multidimensional data array includes filtering at least some of the data in the array. In still another embodiment, processing the multidimensional data array includes interpolating the data in the multidimensional data array, so as to increase a number of the traces in the second collection relative to the first collection. In a disclosed embodiment, processing the multidimensional data array includes compensating for differences in respective velocities of the seismic waves. In another embodiment, processing the multidimensional data array includes applying a migration correction to the multidimensional data array.

In some embodiments, processing the second collection includes integrating the traces in the second collection to produce a composite trace representing the subsurface structures. Processing the multidimensional data array may include applying an inverse of the Radon transform to the processed multidimensional data array, so as to produce the second collection of traces.

There is additionally provided, in accordance with an embodiment of the present invention, apparatus for processing data, including:

an interface, which is coupled to accept a first collection of traces corresponding to signals received over time due to reflection of seismic waves from subsurface structures; and a signal processor, which is configured to define a Radon transform with respect to a set of wavefront parameters of the seismic waves, the transform defining a summation of amplitudes of the seismic waves over trajectories defined by the wavefront parameters, to apply the Radon transform to the first collection of traces so as to convert the first collection into a multidimensional data array that is defined as a function of at least two of the wavefront parameters, to process the multidimensional data array so as to produce a second collection of traces having an improved imaging quality with respect to the first collection, and to process the second collection of traces to generate a seismic image of the subsurface structures at the improved imaging quality.

There is also provided, in accordance with an embodiment of the present invention, a computer software product, including a computer-readable medium in which program instructions are stored, which instructions, when read by a computer, cause the computer to accept a first collection of traces corresponding to signals received over time due to reflection of seismic waves from subsurface structures, to define a Radon transform with respect to a set of wavefront parameters of the seismic waves, the transform defining a summation of amplitudes of the seismic waves over trajectories defined by the wavefront parameters, to apply the Radon transform to the first collection of traces so as to convert the first collection into a multidimensional data array that is defined as a function of at least two of the wavefront parameters, to process the multidimensional data array and re-convert the processed multidimensional data array, so as to produce a second collection of traces having an improved imaging quality with respect to the first collection, and to process the second collection of traces to generate a seismic image of the subsurface structures at the improved imaging quality.

The present invention will be more fully understood from the following detailed description of the embodiments thereof, taken together with the drawings in which:

BRIEF DESCRIPTION OF THE DRAWINGS

FIG. 10 is a flow chart that schematically illustrates a method for analyzing seismic data using WRT, in accordance with an embodiment of the present invention;

FIG. 11 is a simulated seismic image showing interference caused by multiple reflections;

FIGS. 12A and 12B are simulated seismic images showing correction of interference caused by multiple reflections, in accordance with an embodiment of the present invention;

FIGS. 14A and 14B are simulated seismic images showing separation of primary and multiple reflections, in accordance with an embodiment of the present invention;

FIGS. 15A and 15B are real-life seismic images showing separation of primary and multiple reflections, in accordance with an embodiment of the present invention;

FIGS. 17A-17C are simulated seismic images showing a method for wave decomposition using WRT, in accordance with an embodiment of the present invention.

DETAILED DESCRIPTION OF EMBODIMENTS

Overview

Embodiments of the present invention that are described hereinbelow provide improved methods and systems for analyzing seismic data. The methods and systems described herein apply a novel transform, referred to herein as a Wavefront-defined Radon Transform (WRT), which is expressed in terms of wavefront parameters of the seismic waves.

In some embodiments, a signal processor is provided with a collection of traces in a 2-D or 3-D time-offset domain. The set of traces is referred to as an input supergather, and may comprise common-shot gathers, common receiver gathers, CMP gathers, or a combination of different gather types. Generally, the traces in the input supergather need not be pre-selected in any way. The signal processor applies the wavefront-defined Radon transform to the input supergather, thereby converting the input supergather into a multidimensional data array that is defined as a function of at least two wavefront parameters. The wavefront parameters may comprise, for example, angular parameters such as the incidence angle of the waves and curvature radii of the wavefronts.

The signal processor processes the multidimensional data array and then re-converts the array back to the time-offset domain, so as to produce an improved input supergather. The resulting input supergather has an improved imaging quality with respect to the original input supergather, because of the processing applied in the WRT domain. The signal processor generates and presents a seismic image of the subsurface structures at the improved imaging quality, based on the improved input supergather.

Processing in the WRT domain is based on the fact that different seismic events are often characterized by different wavefront parameter values, i.e., mapped to different locations or regions of the WRT domain. Thus, seismic events that are interfered in the time-offset domain may be well-distinguishable in the WRT domain. For example, primary reflections and multiple reflections are often characterized by different wavefront parameter values and can therefore be differentiated from one another in the WRT domain. Thus, the signal processor may perform filtering or muting in the WRT domain to suppress secondary reflections. Processing in the WRT domain can also be used, for example, for trace interpolation, wave decomposition and discrimination based on different wavefront parameters, velocity analysis and filtering.

Because of the ability to resolve different seismic events in the WRT domain, the methods and systems described herein produce imaging results having superior quality with respect to known methods. Moreover, since the disclosed methods may operate on extremely large supergathers without a need for pre-selection of traces, the achievable Signal-to-Noise Ratio (SNR) is considerably higher than in known methods.

System Description

Figure 1:
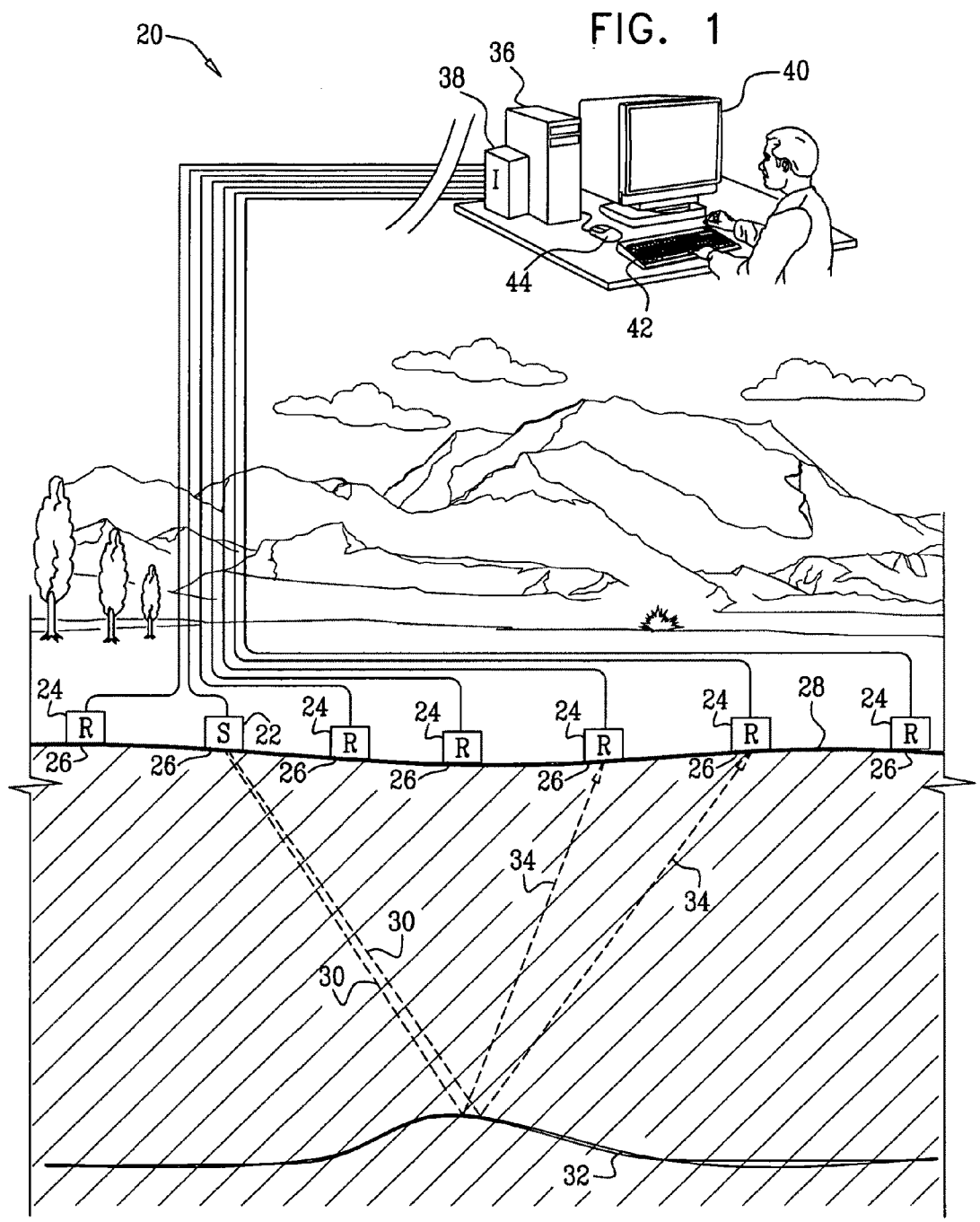
FIG. 1 is a schematic, pictorial illustration of a system for seismic imaging, in accordance with an embodiment of the present invention.

FIG. 1 is a schematic, pictorial illustration of a system 20 for seismic imaging, in accordance with an embodiment of the present invention. Multiple sources 22 and receivers 24 of seismic signals are distributed at an array of locations 26 on a terrestrial surface 28 overlying a subterranean region of interest. Typically, sources 22 comprise explosive charges, which are detonated at specified times, while receivers 24 comprise seismic sensors, which generate seismic traces indicating the amplitude of seismic waves reaching the respective locations 26 as a function of time. Although the sources and receivers are shown in FIG. 1, for the sake of simplicity, as lying along a single line (thus defining a two-dimensional acquisition geometry), system 20 typically comprises an array of sources and receivers that are distributed over an area of the terrestrial surface, and may thus use both two-dimensional and three-dimensional acquisition geometries.

For example, as shown in FIG. 1, a seismic stimulus (such as a detonation or mechanical shock) at source (shot point) 22 causes waves with ray trajectories 30 to propagate down into the earth below surface 28. For inhomogeneous media, trajectories 30 are curvilinear. The waves reflect from a subterranean structure 32, such as an interface between layers of different materials. Reflected waves with ray trajectories 34 (which are curvilinear for heterogeneous media) propagate back to surface 28, where they are sensed by receivers 24. The waves reflected from a given structure reach different sensors at different times due to the different distances that the waves must traverse underground, as well as to variations in the shape of structure 32 and in the intervening layers between the reflecting structure and surface 28.

A signal processor 36 receives the traces generated by receivers 24 via a suitable interface 38. This interface may be configured to control the generation of stimuli and to receive signals from surface 28 in real time, or it may alternatively receive a record of the traces from appropriate data logging equipment (not shown). Processor 36 typically comprises a general-purpose computer, which is programmed in software to carry out the functions that are described herein. This software may be downloaded to the computer in electronic form, over a network, for example, or it may alternatively be provided on tangible media, such as optical, magnetic or electronic memory media. Alternatively, at least some of the functions of processor 36 may be performed by a suitable digital signal processor (DSP) device or other sorts of dedicated or programmable processing hardware. Processor 36 is typically coupled to output seismic data and images via an output device 40, such as a display. For purposes of user interaction, processor 36 may be coupled to one or more user input devices, such as a keyboard 42 and/or a pointing device 44.

In order to create a seismic image of the region below surface 28, processor 36 processes supergathers of seismograms obtained from receivers 24. A given supergather may comprise a collection of common shot gathers (i.e., traces generated due to a single shot point), common receiver gathers (traces generated by a single receiver due to different shot points), CMP-based gathers, or combinations of gather types. The concepts and conventions that are applied by the processor in producing images of subsurface structures are explained hereinbelow with reference to FIGS. 2-4.

Figure 2:
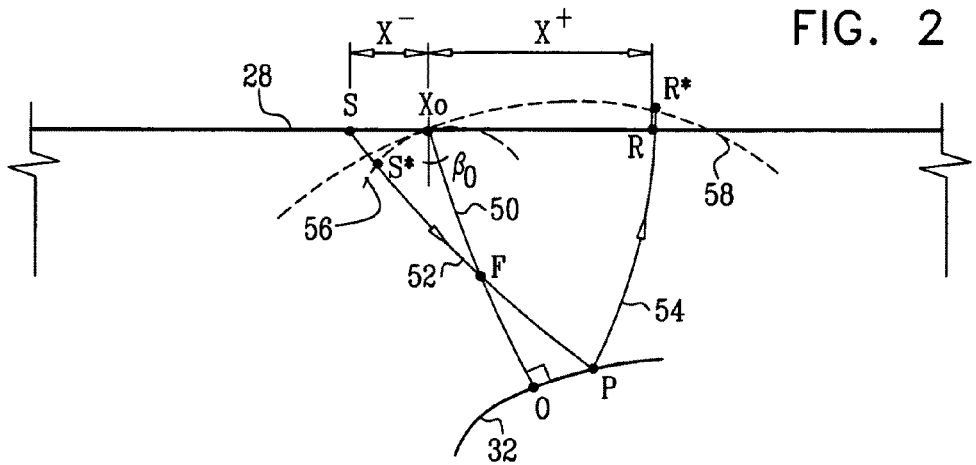
FIGS. 2-4 are schematic, sectional views of a subsurface region showing parameters used in representing seismic waves propagating through the region, in accordance with an embodiment of the present invention.

FIG. 2 is a schematic, sectional view of a subterranean region below surface 28, showing propagation of exemplary seismic waves through the region, in accordance with an embodiment of the present invention. This figure shows some of the parameters used in computing moveout corrections with respect to structure 32 for all gathers of a supergather around a central point denoted $X_0$. The moveout is to be computed here for an arbitrary source point S and receiver point R, which are located on surface 28 at respective distance $X^-$ and $X^+$ from central point $X_0$. Although this embodiment (and the embodiments throughout this application) is illustrated for the sake of simplicity in two-dimensional X-Z space, the principles of these embodiments may be extended in a straightforward manner to the three-dimensional space in which seismic imaging is typically performed.

A central ray 50 from $X_0$ is defined as the ray that is normally incident on structure 32, at a point marked O in the figure. Ray 50 leaves and returns to surface 28 at an emergence angle $\beta_0$ relative to the normal to the surface. A seismic ray 52 from point S reflects from structure 32 at a point P and returns as a reflected ray 54 to point R. In this example, ray 52 intersects ray 50 at a point F. The set of rays 50, 52 and 54 can thus be modeled as a focusing wave, which converges from a wavefront 56 to point F, and then reflects from structure 32 to strike surface 28 along a diverging wavefront 58. Wavefronts 56 and 58 intersect rays 52 and 54 at points S* and R*, respectively.

Assuming the propagation velocity of seismic waves in the region of interest to be uniform, the transit times of the seismic wave along the ray segments S*F and $FX_0$ are equal, i.e., $t_{S^*F} = t_{FX_0}$, as are the transit times along the segments S*PR and $X_0OX_0: t_{S*PR*} = t_{X_oOX_o}$. The wave transit time from source S to receiver R may be expressed as $$t_{SPR} = t_{S*PR*} + t_{SS*} - t_{RR*} \quad [1]$$

The first term in this expression, $t_{S*PR*}$, is equal to the round-trip transit time along the central (zero-offset) ray $X_0FO$. Time corrections $t_{SS*}$ and $t_{RR*}$ can be defined in terms of the near-surface velocity in the subterranean medium and parameters pertaining to the central ray, as explained hereinbelow.

Figure 3:
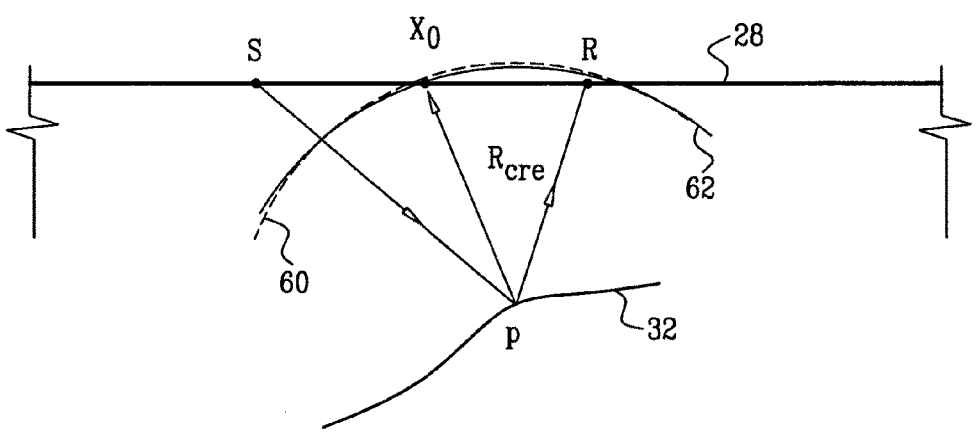
Figure 4:
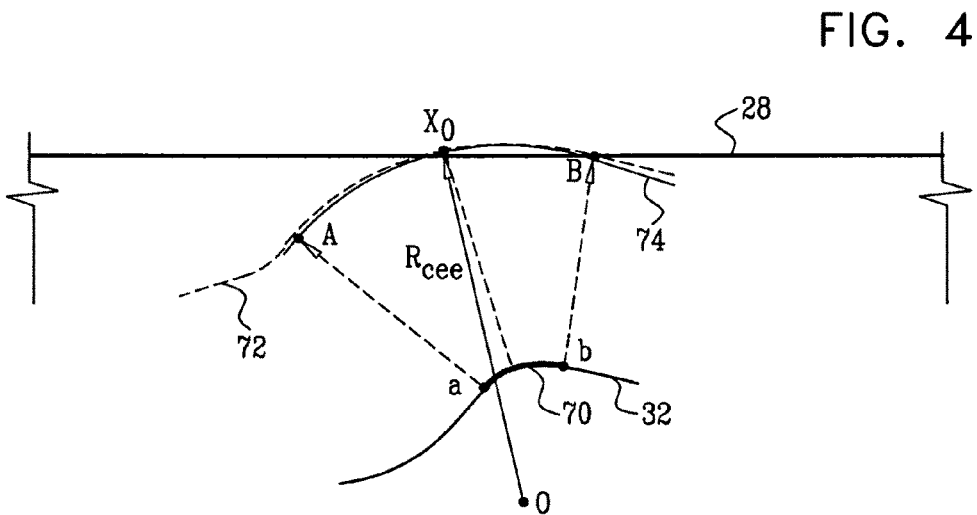

FIGS. 3 and 4 are schematic, sectional views of the subterranean region of FIG. 2, showing wavefront parameters used in computing local moveout corrections in the region, in accordance with an embodiment of the present invention. The computation uses a homeomorphic model, as described in U.S. Pat. No. 5,103,429, cited above. In the embodiments that follow, these parameters include the emergence angle $\beta_0$, shown in FIG. 2 (which may equivalently be defined as the angle of entry); the wavefront radius of curvature $R_{cre}$ of the Common Reflected Element (CRE) wave, illustrated in FIG. 3; and the wavefront radius of curvature $R_{cee}$ of the Common Evolute Element (CEE, or normal wave), illustrated in FIG. 4. As illustrated in FIGS. 2-4, the parameters $\beta_0$, $R_{cre}$ and $R_{cee}$ relate directly to the physical characteristics of structure 32.

As shown in FIG. 3, the wave reflected from point P on structure 32 creates a wavefront 60, which strikes surface 28. $R_{cre}$ is the radius of a circular (or spherical) arc 62 that approximates wavefront 60. This radius can be associated with the conventional stacking velocity in the subsurface region $V_{st}$ by the formula $$R_{cre} = \frac{V_{st}^2 t_0}{2V_0},$$

wherein $V_0$ is the average velocity of seismic waves near surface 28, and $t_0$ is the propagation time of a seismic wave along the segment $X_0P$.

Parameter $R_{cee}$, as shown in FIG. 4, is the radius of a circular (or spherical) arc 74 that approximates a CEE wavefront 72 propagating from a segment 70 of structure 32 to surface 28. CEE wavefront 72 is formed by normal rays emitted by different points, between points a and b, on segment 70. The resulting wavefront 72 between corresponding points A and B is thus defined by the shape of structure 32. $R_{cee}$ models this shape in terms of a virtual center O from which the wavefront radiates.

Certain aspects of computing moveout corrections based on wavefront parameters are addressed in U.S. patent application Ser. No. 11/900,243, entitled "Complex Analysis of Kinematics for Non-Hyperbolic Moveout Corrections," filed Sep. 11, 2007, whose disclosure is incorporated herein by reference.

Wavefront-Defined Radon Transform (WRT)

The Radon transform, as is known in the art, is a mathematical function that integrates a certain physical property of a medium along a particular path through the medium. For seismic applications, the Radon transform is applied to a seismogram d(t,x), wherein x denotes a spatial parameter such as spatial offset and t denotes two-way travel time of the seismic wave. The discrete Radon transform can be written as a summation of amplitudes of the seismic wave along a given path through the subterranean medium:

$$u(\tau, q) = \sum_x d(t, x). \quad [2]$$

The variable t in Equation [2] determines the path along which the summation is performed. Different expressions of t as a function of q, $\tau$ and x produce different summation paths, or trajectories, through the medium.

Embodiments of the present invention that are described herein use a novel transform, referred to herein as a Wavefront-defined Radon Transform (WRT), in which the summation trajectories are defined in terms of wavefront parameters of the seismic waves. In wave theory, a wavefront is commonly defined as an equi-phase surface of a propagating wave, i.e., the locus of points having the same phase of the wave. In the context of the present patent application and in the claims, the term "wavefront parameter" is used to describe any quantity that characterizes the geometry of the wavefront of a seismic wave. Wavefront parameters may comprise angular parameters such as incidence or emergence angles of the wave, radial parameters such as curvature radii of the wavefront, or any other suitable parameter.

As will be explained below, signal processor 36 converts time-offset seismograms using this transform, applies various types of processing in the transform domain, and converts the processed seismograms back to the time-offset domain. By applying processing in the transform domain, signal processor 36 can apply moveout corrections, differentiate between desired and undesired seismic signals, and perform various other kinds of processes, which are explained in detail below.

In WRT, the parameter t, which defines the summation path through the medium, is defined in terms of wavefront parameters of the seismic wave. For example, in the embodiments described herein, the summation path is defined in terms of the emergence (or incidence) angle $\beta$ and the wavefront curvature radii $R_{cre}$ and $R_{cee}$, defined above. In alternative embodiments, however, the summation path may be defined using any other suitable set of parameters that are related to the wavefront characteristics of the seismic wave. Other sets of wavefront parameters that may be used to define the summation path comprise, for example tilting parameters, defocusing parameters, coma parameters and/or spherical aberration parameters, as applied for example in optics.

In the methods and systems described herein, the WRT summation is typically carried out over a large supergather, which may comprise common-shot gathers, CMP gathers, common-receiver gathers, or a mixture of gather types. The supergather typically comprises traces that lie in the first Fresnel zone around the central point $X_0$. Unlike some known seismic analysis methods, which operate on sets of traces that have undergone some kind of pre-screening or sorting (e.g., traces having a common mid-point, common source or common receiver), the WRT-based methods described herein may operate on an arbitrary, unsorted collection of traces. Since the methods described herein do not require any sort of pre-selection or screening of traces, they may operate on large collections of traces, typically comprising thousands of traces. Since Signal-to-Noise Ratio (SNR) typically improves with the number of samples, the SNR and accuracy of the disclosed methods are considerably better than those of known methods.

In some embodiments, the WRT summation path is given by $$t(\beta, R_{cre}, R_{ece}) = \frac{\sqrt{(R_s)^2 + 2R_s \Delta X^+ \sin\beta + (\Delta X^+)^2} - R_s}{V_0} + \frac{\sqrt{(R_r)^2 + 2R_r \Delta X^- \sin\beta + (\Delta X^-)^2} - R_r}{V_0}$$ [3]

wherein $$R_s = \frac{1-\sigma}{\frac{1}{R_{cee}} - \frac{\sigma}{R_{cre}}} \quad R_r = \frac{1+\sigma}{\frac{1}{R_{cee}} - \frac{\sigma}{R_{cre}}}$$ [4]

$R_s$ and $R_r$ denote the curvature radii of circular (or spherical) arcs that approximate the wavefronts in the vicinity of the source and receiver, respectively. σ denotes a focusing parameter that is given by $$\sigma = \frac{\Delta X^+ - \Delta X^-}{\Delta X^+ + \Delta X^- + 2\frac{\Delta X^+ \Delta X^-}{R_{cre}}\sin\beta}.$$ [5]

The formulas above were derived and presented by Berkovitch in "The Multifocusing Method for Homeomorphic Imaging and Stacking of Seismic Data" (Doctoral Thesis, Tel Aviv University, 1995), which is incorporated herein by reference. As can be appreciated from Equation [3], the three parameters $\beta$, $R_{cre}$ and $R_{cee}$ are unknown. The parameters $\Delta X^+$ and $\Delta X^-$ are determined by the acquisition geometry, and $V_0$ can be estimated in advance from surface measurements.

In some embodiments, it can be assumed that $R_{cee}=\infty$, $R_{cre}$ is referred to as $R_{cre}=R$ for brevity, so that t in Equation [3] now depends on only two parameters—$\beta$ and R. The derivation above of the multifocusing model and the methods described below refer to any suitable type of gather around a central point $X_0$. The multifocusing model described above creates a one-to-one relationship between wavefront parameters and properties of subsurface reflectors. Alternatively, other approximating expressions and formulas may be used in calculating the above-mentioned parameters. Some of these alternative methods may be regarded as a special case of the method described herein.

For example, Chira-Oliva et al. present the following formula for calculation of moveout correction in "2-D ZO CRS Stack by Considering an Acquisition Line with Smooth Topography" Revista Brasileira de Geofisica, volume 23, number 1, 2005, pages 1-18, which is incorporated herein by reference:

$$t^2(x_m, h) = \left(t_0 + 2\frac{\sin\beta_0^*}{v_1}(x_m - x_0)\right)^2 + \frac{2t_0}{v_1}\left(\frac{\cos^2\beta_0^*}{R_N} - \cos\beta_0^* K_0\right)(x_m - x_0) + +\frac{2t_0}{v_1}\left(\frac{\cos^2\beta_0^*}{R_{NIP}} - \cos\beta_0^* K_0\right)h^2$$ [6]

Equation [6], t denotes the reflection time, $t_0$ denotes zero-offset time, $\beta^*_0$ denotes the emergence angle of the normal ray, $x_m$ denotes the midpoint coordinate, $x_0$ denotes the central point coordinate, $K_0$ denotes the local curvature of the earth's surface at a point on the acquisition line, h denotes the half-offset, $R_N$ denotes the radius of curvature at $x_0$ of a hypothetical N (normal) wavefront, and $R_{NIP}$ denotes the radius of curvature at $x_0$ of the hypothetical NIP (normal incidence point) wavefront. If the variables in equation [3] are given their equivalent meanings in the model ($R_{cee}=R_N$, $R_{cre}=R_{NIP}$, $X^{\pm}=h$, $V_0=v_1$), and equation [3] is expanded into a Taylor series, it can be seen that equation [6] is a hyperbolic approximation of equation [3].

For each sample ($t_0$) of the central trace, signal processor 36 applies WRT by summing the amplitudes of the seismic wave along summing paths defined by parameters β and R in Equation [3], to produce the WRT space. Thus, the signal processor converts seismogram d(t,x) using WRT into a three-dimensional (3-D) space, whose axes are the emergence (or incidence) angle β, the curvature radius R and the intercept time τ. This space is referred to herein as the WRT domain or the transform domain. The WRT operation can thus be written as $$u'(\tau, \beta, R) = \sum_x d[t(\beta, R), x]$$ [7]

As will be explained and demonstrated below, the WRT operation typically maps specific seismic events to focused regions in the WRT domain. For example, primaries (i.e., seismic waves that were reflected once from a given reflector that is to be mapped) and multiples (i.e., waves that have undergone multiple reflections and are usually regarded as noise that should be suppressed or differentiated from the primaries) are often mapped to different regions of the WRT domain. Thus, transformation from the time-offset domain to the WRT (wavefront parameter) domain can differentiate between desired signals and noise. Several techniques for processing the converted seismogram in the WRT domain, which make use of this spatial differentiation, are described below.

Figure 5:
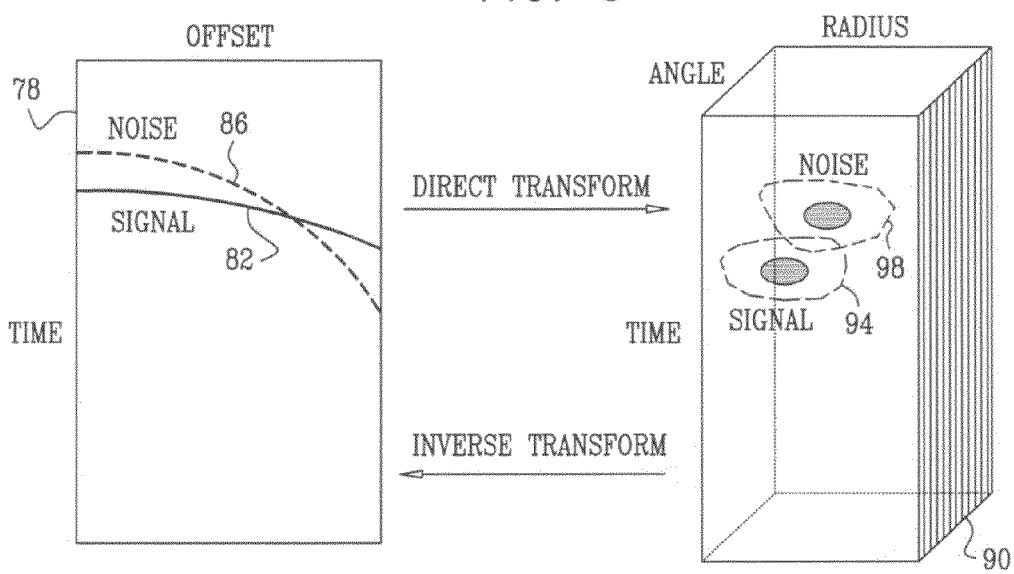
FIG. 5 is a schematic illustration of direct and inverse Wavefront-defined Radon Transforms (WRT), in accordance with an embodiment of the present invention.

FIG. 5 is a schematic illustration of the transformation between the time-offset domain and the WRT domain, in accordance with an embodiment of the present invention. In the example of FIG. 5, a seismogram 78 in the time-offset domain comprises a desired signal 82 and a noise component 86. The noise artifact may be caused, for example, by waves that have undergone multiple reflections. As can be seen in the figure, the signal and noise components overlap and are difficult to differentiate from one another.

Seismogram 78 is converted, using the methods described herein, to a 3-D volume 90 in the WRT domain. The axes of the WRT domain comprise the intercept time r and wavefront parameters, in the present example the emergence angle β and the curvature radius R. In alternative embodiments, the WRT domain may have more than three dimensions. For example, the WRT domain may comprise a four-dimensional domain whose axes are τ, β, $R_{cre}$ and $R_{cee}$. The processor typically represents the WRT domain using a multidimensional data array, such as a multidimensional matrix.

In the WRT domain, the energy of signal component 82 is confined to a volume 94, and the energy of noise component 86 is confined to a volume 98. Volumes 94 and 98 in the WRT domain are well-separated from one another, and the signal and noise can therefore be resolved.

Correction in the WRT Domain

Transforming a seismogram to the WRT domain sometimes introduces distortion effects into the converted seismogram. These effects are demonstrated by FIGS. 6A-6C below.

Figure 6A:
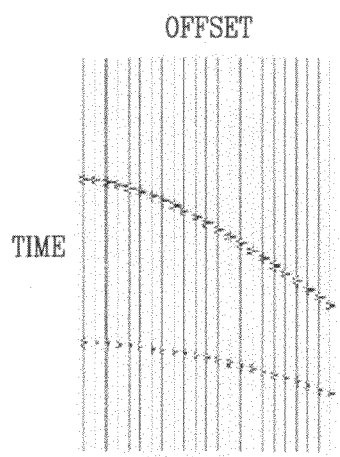
FIGS. 6A-6C, 7A-7C and 8A-8C are seismic images obtained at different stages of a method for analyzing seismic data using WRT, in accordance with embodiments of the present invention.
Figure 6B:
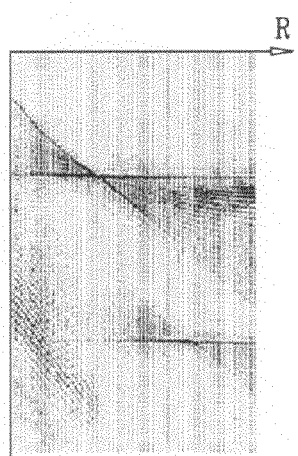
Figure 6C:
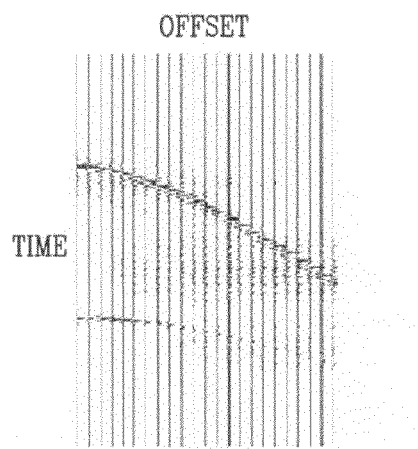

FIGS. 6A-6C are seismic images obtained at different stages of conversion to and from the WRT domain, in accordance with an embodiment of the present invention. FIG. 6A shows a seismogram in the time-offset domain. The seismogram of FIG. 6A shows seismic reflections having hyperbolic arrivals. FIG. 6B shows a 2-D projection of the 3-D WRT volume, which represents the seismogram of FIG. 6A after applying WRT, onto the R-τ plane. The 2-D projection of FIG. 6B is produced by summing the layers of the 3-D $u'(\tau,\beta,R)$ function along the β axis.

As can be seen in FIG. 6B, the converted seismogram in the WRT domain image suffers from both horizontal and oblique smearing, which is caused by aperture limitation in the conversion process. The horizontal artifact in this example is caused by near-offset energy sharing, and the oblique smearing is caused by far-offset truncation. In addition, false events caused by limited space-time sampling (Gibbs-effect) and insufficient spatial sampling interval (aliasing effect) are visible. FIG. 6C shows a reconstructed time-offset seismogram that is produced by applying an inverse WRT transform to the 3-D WRT domain image. As can be appreciated, the seismogram of FIG. 6C does not properly reproduce the original seismogram of FIG. 6A.

In order to reduce the distortion effects introduced by the transform into the WRT domain, signal processor 36 applies a suitable correction to the data. Various types of correction may be used. The correction may be performed in the WRT domain, or in time domain after performing inverse WRT transform. The correction can be performed in a single transformation step, or in a sequence of model iterations. One of the key problems associated with the generalized Radon transform is that it often does not have an inverse operator. Considerable research and experimental efforts were invested in finding approximate methods for reconstructing data by an inverse Radon-transform.

For example, a least-squares formulation of the Radon transform is proposed in the article by Thorson and Claerbout, cited above. A sparse Radon transform is proposed by Trad et al., in "Accurate Interpolation with High-Resolution Time-Variant Radon Transforms," Geophysics, Volume 67, number 2, March, 2002, pages 644-656, which is incorporated herein by reference. An iterative method is proposed by Fomel in "Least-Square Inversion with Inexact Adjoins. Method of conjugate directions: A Tutorial," Stanford Exploration Project (SEP) report SEP-92, 1996, pages 253-265, which is incorporated herein by reference. High resolution methods are described, for example, in U.S. Pat. Nos. 6,636,809 and 6,832,161, whose disclosures are incorporated herein by reference, and by Hugonnet et al., in "High Resolution Radon: a Review," EAGE 63$^{rd}$ Conference and Technical Exhibition, Amsterdam, The Netherlands, Jun. 11-15, 2001, which is incorporated herein by reference.

The description that follows uses the well-known Tikhonov regularization method to solve the least-squares inverse problem. Tikhonov regularization is described, for example, by Thamban et al., in "The Trade-Off between Regularity and Stability in Tikhonov Regularization," Mathematics and Computation, Volume 66, number 217, January, 1997, pages 193-206, which is incorporated herein by reference. Any of the above-cited methods may be applied for the correction of the data before the inversion Radon transform. A generalization of the inverse Radon process to the 3-D case is presented below, and is used to correct the data in the WRT domain.

In the discrete case, the inverse transform that converts from the 3-D transform domain back to the offset-time domain is given by $$d'(t, x) = \sum_{\beta R} u[\tau = -t(\beta, R), \beta, R] \qquad [8]$$

wherein $t(\beta,R)$ denotes the summation path defined in Equation [3]. Equation [7] can be converted to matrix form by writing $d=d(t,x)$, $u=u(\tau,\beta,R)$ \hfill [9]

Since time-domain correction methods are often computationally-intensive, processor 36 applies correction in the present embodiment in the frequency domain (although correction in time domain is also possible). As described, for example, by Treitel et al., in "Plane-wave decomposition of seismograms," cited above, applying a Fourier transform to Equation [8] produces:

$$d(\omega, x) = \sum_{\beta R} u(\omega, \beta, R) e^{-i\omega t(\beta,R)} \qquad [10]$$

The Fourier transform of Equation [9] can be written as $d=d(\omega,x)$, $u=u(\omega,\beta,R)$ \hfill [11]

Equation [7] can then be written in matrix form as $\bar{u}=Ld$ \hfill [12]

wherein L denotes a WRT operator, which integrates the data in the time-space domain along the summing path determined by equation [3]. Operator L is given by $$L = \begin{bmatrix} e^{-i\omega t(\beta'_1,R'_1,x_1)} & e^{-i\omega t(\beta'_1,R'_1,x_2)} & \ldots & e^{-i\omega t(\beta'_1,R'_1,x_n)} \\ e^{-i\omega t(\beta'_2,R'_1,x_1)} & e^{-i\omega t(\beta'_2,R'_1,x_2)} & \ldots & e^{-i\omega t(\beta'_2,R'_1,x_n)} \\ \ldots & \ldots & \ldots & \ldots \\ e^{-i\omega t(\beta'_m,R'_k,x_1)} & e^{-i\omega t(\beta'_m,R'_k,x_1)} & \ldots & e^{-i\omega t(\beta'_m,R'_k,x_n)} \end{bmatrix} \qquad [13]$$

The inverse Fourier transform of Equation [12] is given by $\bar{d}=L^*\bar{u}$ \hfill [14]

wherein $\bar{d}$ denotes the reconstructed data in the time-offset domain and $\bar{u}$ denotes the model. L* is an operator that integrates the data in the 3-D wavefront parameter (τ,β,R) domain along the inverse summing path determined by equation [3], i.e., the inverse WRT operator. L* is given by $$L^* = \begin{bmatrix} e^{i\omega t(\beta''_1,R''_1,x_1)} & e^{i\omega t(\beta''_1,R''_1,x_2)} & \ldots & e^{i\omega t(\beta''_1,R''_1,x_n)} \\ e^{i\omega t(\beta''_2,R''_1,x_1)} & e^{i\omega t(\beta''_2,R''_1,x_2)} & \ldots & e^{i\omega t(\beta''_2,R''_1,x_n)} \\ \ldots & \ldots & \ldots & \ldots \\ e^{i\omega t(\beta''_m,R''_k,x_1)} & e^{i\omega t(\beta''_m,R''_k,x_1)} & \ldots & e^{i\omega t(\beta''_m,R''_k,x_n)} \end{bmatrix} \qquad [15]$$

In the present example, signal processor 36 applies correction by determining an estimate of $u(\omega,\beta,R)$, having a higher resolution than in conventional CMP-based methods (slant-stack, parabolic and hyperbolic Radon transforms), such that the difference e(t,x) between the actual input gather d(t,x) and the modeled time-offset gather $\bar{d}(t,x)$ is minimal in the least-squares sense. In other words, processor 36 corrects the model $\bar{u}$ of Equation [12] using a least-squares solution that is formulated as $$\min_u \|\bar{u} - LL^* u\|^2 \qquad [16]$$

The solution of Equation [16] is given by $$u = (LL^*)^* \bar{u} = H^* \bar{u} \qquad [17]$$

wherein u denotes the corrected data in the WRT domain, H=LL* denotes the Fourier transform operator, and H* denotes the correction operator (matrix) applied to $\bar{u}$, which is a pseudo-inverse of the WRT operator. Applying the inverse WRT transform to the corrected model produces $$d = L^* u \qquad [18]$$

wherein d denotes the corrected input gather (data).

In some embodiments, in order to apply processing in the WRT domain, processor 36 performs transformation from the frequency domain to the time domain, and then an inverse WRT according to Equation [8] above.

The processor defines a correction matrix $H_\omega$ based on Equations [13] and [15]. The correction matrix is given by $$H_\omega = LL^* = \sum_x e^{-i\omega(t(\beta', R', x) - t(\beta'', R'', x))} \qquad [19]$$

wherein t(β,R,x) denotes a moveout correction calculated using expression [3] over all offsets and gathers in the super-gather.

Processor 36 calculates the correction for all frequency slices $\omega = \omega_{min} \ldots \omega_{max}$ of the 3-D volume $\bar{u}(\omega,\beta,R)$. After applying the correction, the signal processor transforms volume u from the frequency domain into the time domain with a subsequent inverse WRT.

In some cases, however, the least-squares expression [16] is ill-conditioned and its solution [17] is not unique, since matrix H is singular. Processor 36 may solve the ill-conditioned least-squares problem, for example by applying high resolution methods known in the art. Several exemplary methods that can be used for this purpose are described in the above-cited references.

Such high resolution methods typically solve the problem of ill-conditioning by restating the original least-squares problem. For example, positive weights may be derived from the original data, in order to direct the solution to the corresponding data ranges:

$$\min_u \|\bar{u} - LWL^* u\|^2 \qquad [20]$$

wherein W denotes a weighting matrix, which uses a certain a-priori semblance defined over the data. For example, the weights may be selected from the data itself, e.g.:

$$W(x) = \frac{|d(x)|}{\max_X |d(x)|}. \qquad [21]$$

The corresponding least-squares solution is given by $$u = (LWL)^{-1} \bar{u} \qquad [22]$$

The least-squares problem can be solved by a_Tikhonov regularization method:

$$\min_m \|\bar{m} - LL^* m\|^2 + \lambda\|m\|^2 + \mu\|Dm\|^2 + \rho\|\nabla m\|^2 \qquad [23]$$

wherein D denotes the first-order derivative operator, ∇ denotes the Laplace operator, and λ,μ,ρ are positive weights. This least-squares problem gives preference to a particular solution (for given λ,μ,ρ), such that larger values of λ give preference to solutions having smaller norms, and μ and ρ typically direct the problem toward smoother solutions.

The solution is obtained explicitly by:

$$\bar{m} = (LL^* + \lambda I + \mu D^T D + \rho \nabla^T \nabla)^{-1} m \qquad [24]$$

The effectiveness of the correction process is demonstrated by FIGS. 7A-7C, 8A-8C and 9A-9F below.

Figure 7A:
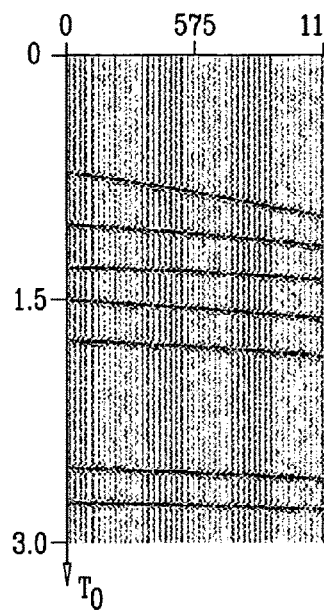
Figure 7B:
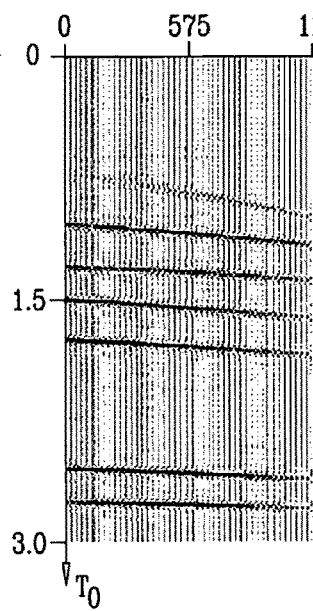
Figure 7C:
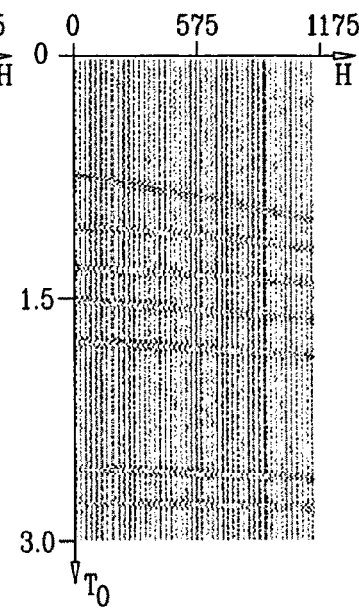

FIGS. 7A-7C show simulated seismograms before and after WRT conversion, without applying data correction, in accordance with an embodiment of the present invention. FIG. 7A shows the original seismogram in the time-offset domain. FIG. 7B shows a reconstructed seismogram, which is produced by applying WRT followed by inverse WRT, without applying correction. FIG. 7C shows the difference between the original and reconstructed seismograms. As can be appreciated, the WRT and inverse WRT transformations introduce distortion into the reconstructed seismogram. This distortion is seen clearly in FIGS. 7B and 7C.

Figure 8A:
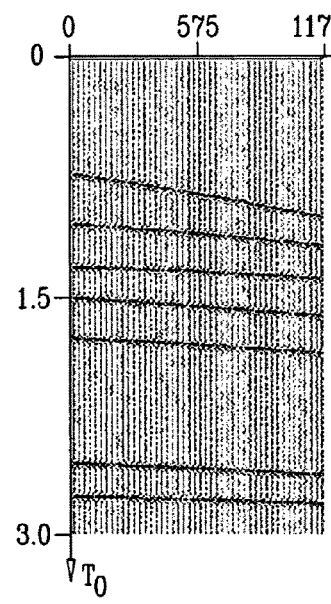
Figure 8B:
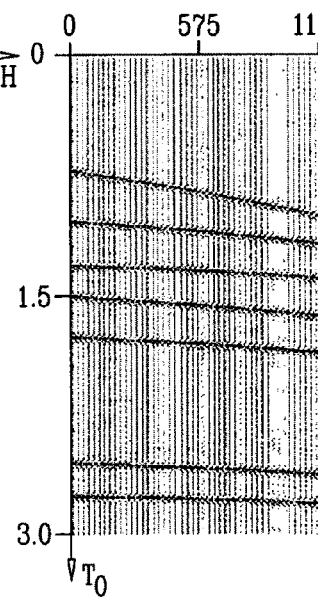
Figure 8C:
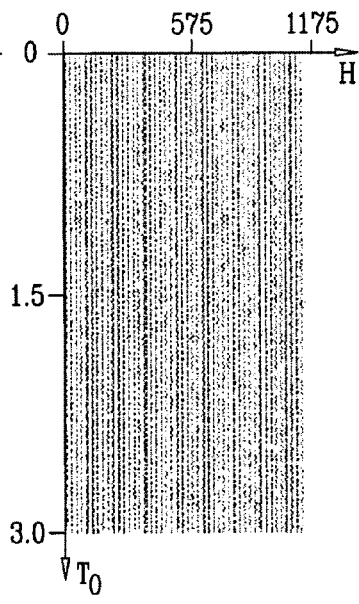

FIGS. 8A-8C show simulated seismograms before and after WRT conversion, with data correction applied in the WRT domain, in accordance with an embodiment of the present invention. FIG. 8A shows the original seismogram in the time-offset domain. FIG. 8B shows a reconstructed seismogram, which is produced by applying WRT followed by inverse WRT. In this example, however, processor 36 applies data correction to reduce distortion. FIG. 8C shows the difference between the original and reconstructed seismograms. As can be seen in FIGS. 8B and 8C, the reconstructed seismogram highly resembles the original seismogram, and the distortion effects are substantially canceled.

Figure 9A:
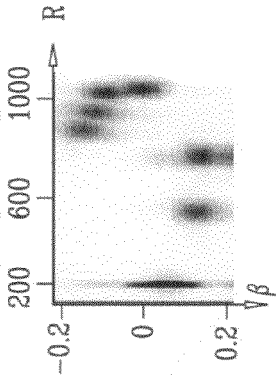
FIGS. 9A-9F are graphs showing two-dimensional (2-D) projections of a three-dimensional (3-D) seismic image in the WRT domain, in accordance with embodiments of the present invention.
Figure 9B:
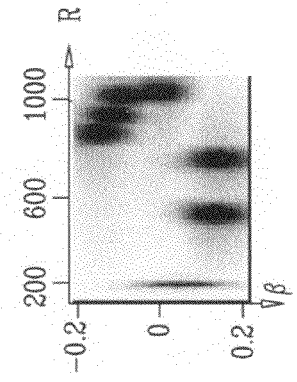
Figure 9C:
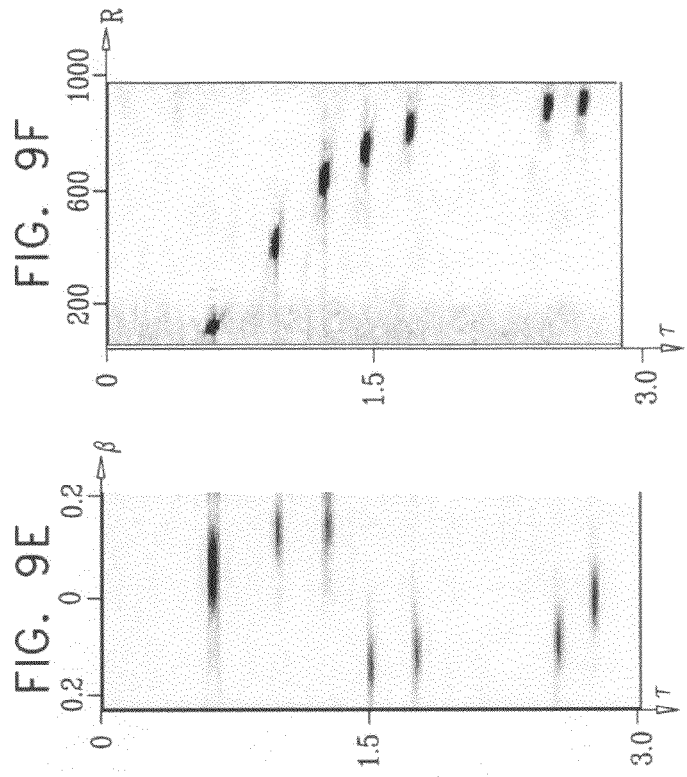
Figure 9D:
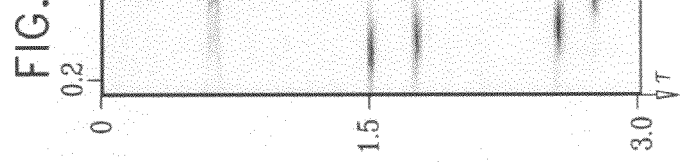
Figure 9E:
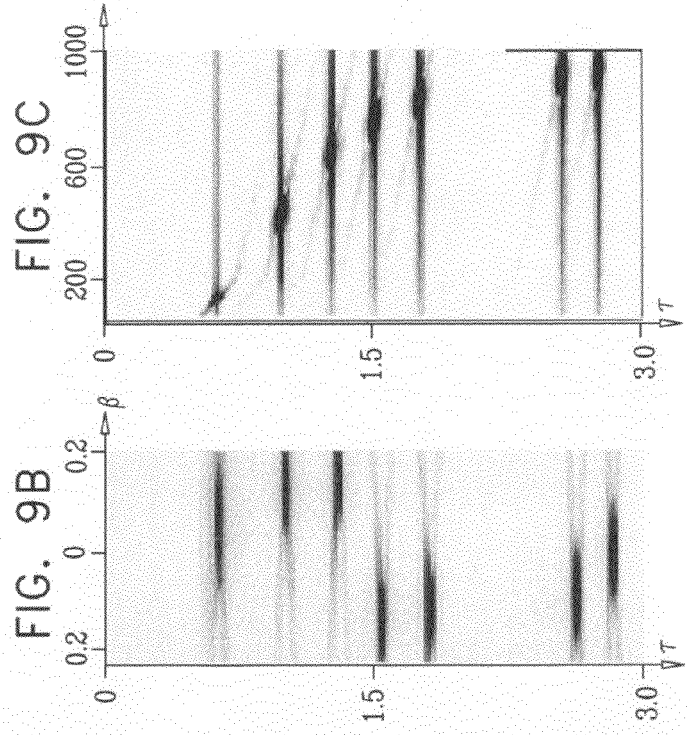
Figure 9F:
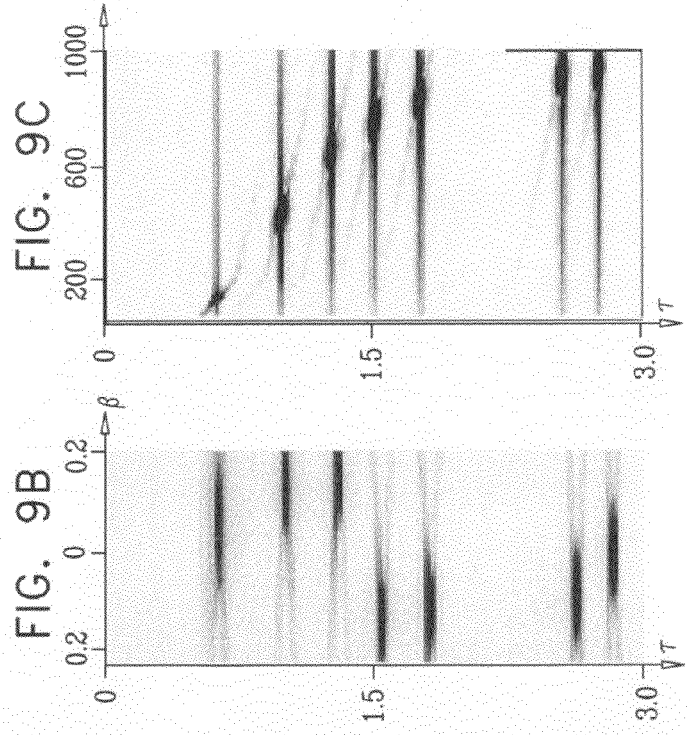

FIGS. 9A-9F are graphs showing 2-D projections of 3-D seismic images in the WRT domain, with and without correction, in accordance with embodiments of the present invention. FIGS. 9A-9C show projections of the 3-D WRT domain onto the R-β, β-τ and R-τ planes, respectively, for the case in which no correction is applied. FIGS. 9D-9F show the respective projections onto the R-β, β-τ and R-τ planes, when correction is applied. As can be appreciated, the seismic events shown in FIGS. 9D-9F are much better focused in well-defined regions of the 3-D WRT domain, in comparison with the corresponding FIGS. 9A-9C.

Seismic Data Processing Method Description

FIG. 10 is a flow chart that schematically illustrates a method for analyzing seismic data using WRT, in accordance with an embodiment of the present invention. Using the method of FIG. 10, system 20 maps certain subsurface structures and presents the mapping results to a user. The method begins with system 20 collecting a set of seismic traces, referred to as an input supergather, at a trace collection step 100. The traces may comprise CMP gathers, common-shot gathers, common receiver gathers, common-source gathers, a mixture of multiple gather types, or any suitable collection of traces. Since the methods described herein do not rely of any pre-selection, sorting or screening of traces, the supergather may comprise hundreds or thousands of traces.

Signal processor 36 applies WRT to the input supergather, at a WRT step 102. In other words, as explained above, the signal processor converts the input supergather to a multidimensional data array, which is defined in terms of the wavefront parameters. For example, processor 36 may apply WRT in the frequency domain, in accordance with Equations [12] and [13] above. The signal processor calculates the volume $\bar{u}(\omega,\beta,R)$.

Processor 36 then applies data correction in the WRT domain, at a correction step 104. The signal processor corrects volume $\bar{u}(\omega,\beta,R)$, frequency by frequency, using the expression in Equation [17]. Thus, for every frequency in the range $\omega=\omega_{min} \ldots \omega_{max}$, the slice $\bar{u}(\beta,R)$ is processed to obtain the corrected volume $u(\omega,\beta,R)$. The processor transforms the $u(\omega,\beta,R)$ volume to the time domain, at a time domain transformation step 106. The signal processor typically applies Fast Fourier Transform to the appropriate vectors for each pair of $\beta$ and R values, to produce the volume $u(t,\beta,R)$.

Signal processor 36 processes the volume $u(t,\beta,R)$ in the WRT domain, at a processing step 108. Processor 36 may apply various methods in the WRT domain, such as suppression of multiple reflections, seismogram interpolation, wave decomposition based on velocity or emergence angle, velocity analysis, filtering, migration, etc. These processes are explained in detail further below. The processing applied in the WRT domain improves the achievable imaging quality of the supergather.

After processing the data in the WRT domain, processor 36 converts the processed data back to the time-offset domain by applying inverse WRT, at an inverse WRT step 110. The output of step 110 is another collection of traces, which is referred to as an improved input supergather.

The signal processor generates a seismic image of the mapped subsurface structures based on the improved supergather. For example, the signal processor may apply moveout correction in accordance with any suitable method, or otherwise combine the traces in the improved supergather to produce a single composite trace that represents the mapped subsurface structures.

Signal processor 36 outputs the processing result, at an outputting step 112. The result typically comprises the composite trace, which properly integrates the information obtained from improved supergather regarding the mapped subterranean structure. An alternative type of output comprises one or more CMP gathers, which are obtained by selecting the appropriate traces from the improved supergather. The result is provided to the user using output device 40.

Because of the processing applied in the WRT domain, the imaging quality of the processed supergather is improved with respect to the original input supergather. In the present context, the term "improved imaging quality" refers to any improvement in the ability to identify, characterize and/or map the subsurface structures in question. Improved imaging quality may relate, for example, to improved SNR, to improved resolution and/or to suppression of undesired artifacts in the seismic image.

Noise Suppression

As is well-known in the art, when summing N samples of data that is corrupted by random noise, the Signal-to-Noise Ratio (SNR) increases by a factor of $\sqrt{N}$. As described above, application of the direct and inverse WRT involves summing of a large number of traces, often up to a thousand traces. Therefore, the methods described herein provide inherent suppression of noise. As can be seen, for example, in FIGS. 7B and 8B, the energy of noise components is considerably suppressed with respect to the energy of the desired signal components after direct and inverse WRT.

Thus, the methods and systems described herein can be used for increasing the quality of pre-stack seismic reflection data. The pre-stack gathers are regularized and their SNR is improved with respect to conventional CMP gathers. The improved-quality pre-stack data can be used in any suitable subsequent processing, such as in pre-stack depth migration. (Migration processes are addressed in greater detail further below.) Pre-stack depth-migrated supergathers, after application of direct and inverse WRT, enable high-quality control over the velocity model used by the migration process. Such control is not offered by conventional CMP processing.

Suppression of Multiple Reflections

Primary reflections are waves that were reflected once from a certain subterranean structure before reaching the receiver. Primary reflections are the ones that convey useful information regarding the mapped structures. However, some of the artifacts that appear in time-offset seismograms are caused by multiples, i.e., by waves that have undergone multiple reflections from a number of reflectors before reaching the receiver. Since multiple reflections interfere with primary reflections, it is advantageous to suppress the multiple reflection level in order to improve mapping quality.

Since primary and multiple reflections often have different velocities, they are often mapped to different regions in the WRT (e.g., $t,\beta,R$) domain. In some embodiments, an operator assisted by signal processor 36 differentiates between multiples and primary reflections after applying WRT (e.g., at processing step 108 of FIG. 10 above), and suppresses the differentiated multiple reflections. For example, the processor may mute, filter or otherwise suppress regions of the WRT domain that are identified as containing multiple reflections. As a result, the level of multiple reflections in the reconstructed seismogram (after inverse applying WRT) is considerably reduced. The effectiveness of multiple reflection suppression is demonstrated by FIGS. 11, 12A-12B, 13A-13C and 14A-14B.

FIG. 11 shows a simulated seismogram 116, which contains artifacts that are caused by multiple reflections. In the present example, seismogram 116 comprises a supergather of multiple common-shot gathers. An excerpt 120 shows a single common-shot gather in greater detail. The artifacts caused by multiple reflections can be clearly seen.

FIGS. 12A and 12B are simulated reconstructed seismograms, following WRT and inverse WRT, in accordance with embodiments of the present invention. The original seismogram from which the two reconstructed seismograms were produced contained multiple reflections, similarly to the seismogram of FIG. 11. In producing the seismogram of FIG. 12A, processor 36 did not carry out suppression of multiple reflections. In producing FIG. 12B, the signal processor suppressed regions of the WRT domain that contained the multiple reflection components. As can be clearly seen, the level of undesired artifacts in FIG. 12B is considerably lower than in FIG. 12A.

Figure 13C:
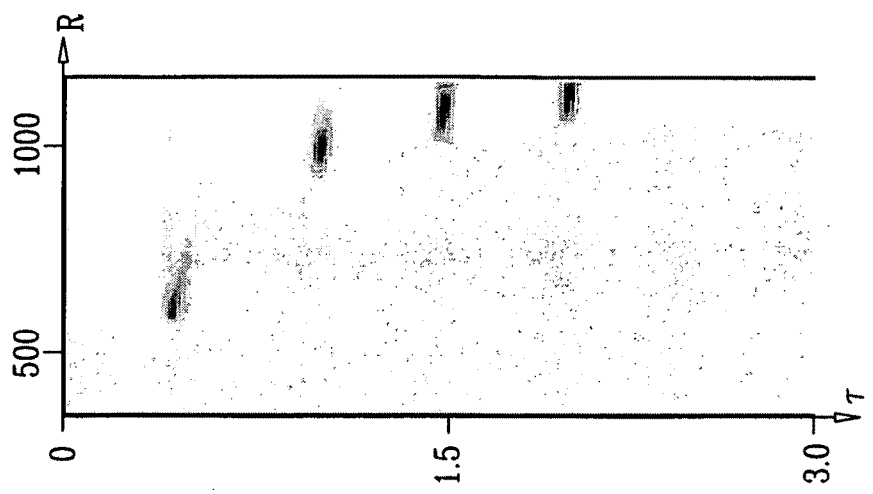
FIGS. 13A-13C are 2-D projections of a 3-D WRT domain showing separation of primary and multiple reflections, in accordance with an embodiment of the present invention.
Figure 13B:
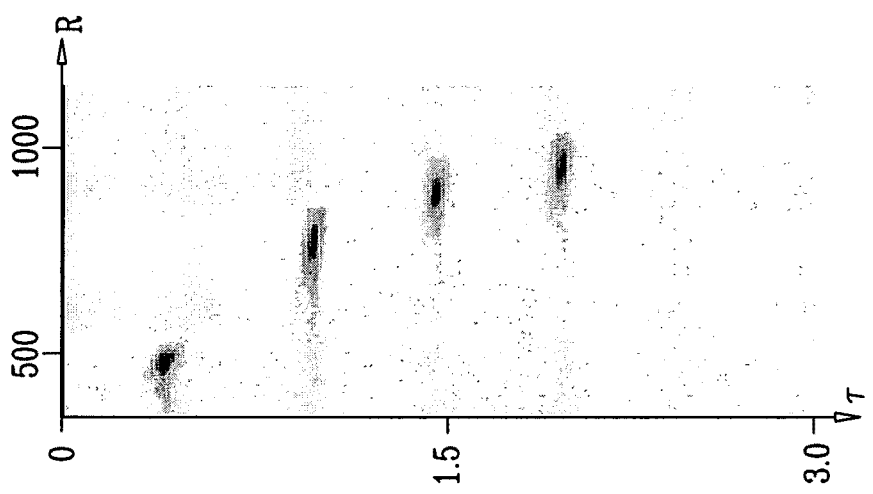
Figure 13A:
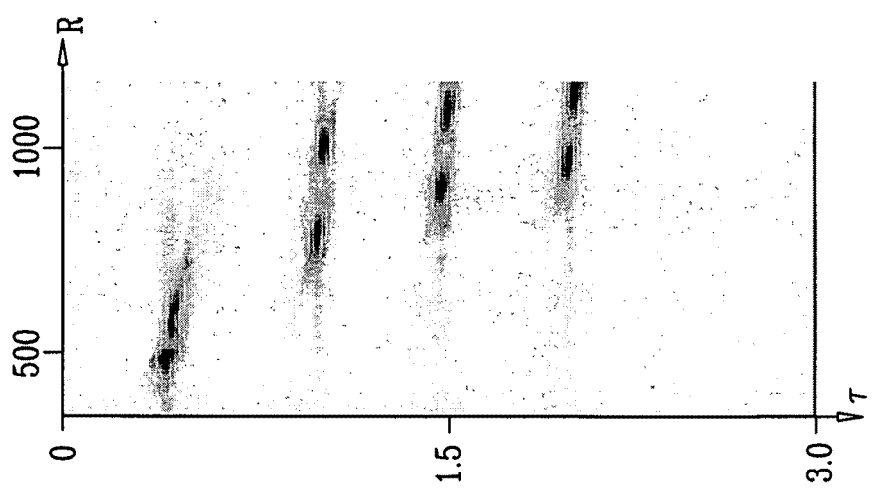

FIGS. 13A-13C are simulated 2-D projections of the 3-D WRT domain showing separation of primary and multiple reflections, in accordance with an embodiment of the present invention. The figures show projections of the WRT domain onto the R-$\tau$ plane (after integration over the $\beta$ axis). FIG. 13A shows the projection of the original WRT domain, before multiple reflection suppression. As can be seen, primary and multiple reflections are mapped to separate, well-defined regions in the WRT domain. FIG. 13B shows only the multiple reflection components with the primary reflection components muted, and FIG. 13C shows only the primary reflection components with the multiple reflection components muted.

FIGS. 14A and 14B show simulated seismic images showing separation of primary and multiple reflections, in accordance with an embodiment of the present invention. FIG. 14A shows a reconstructed supergather 124 (after WRT and inverse WRT), in which the primary reflections were muted in the WRT domain to preserve the multiple reflections. FIG. 14B shows a reconstructed supergather 128, in which the secondary reflections were muted in the WRT domain to preserve the primary reflections. FIG. 14A was produced by applying inverse WRT to the volume shown in FIG. 13B, and FIG. 14B was produced by applying inverse WRT to the volume shown in FIG. 13C.

FIGS. 15A and 15B are seismic images showing separation of primary and multiple reflections, in accordance with an embodiment of the present invention. The left-hand-side plot in FIG. 15A shows a real-life multifocusing stack, which was obtained by summing supergathers having multiple reflections in the interval 2.5-3.5 s. As can be seen in the figure, the most powerful multiple reflection is located at approximately 3.3 s. The right-hand-side plot of FIG. 15A shows a projection of the corresponding WRT space onto the $R_{cre}$-$\tau$ plane. The regions associated with primary and multiple reflections are separated by a dashed line. FIG. 15B shows a multifocusing stack that is obtained by summing supergathers after performing direct WRT, correction, muting of multiple reflections in the WRT domain, and inverse WRT.

Trace Interpolation Using WRT

In some embodiments, the Wavefront-defined Radon transform can be used for interpolating time-offset seismograms. Interpolation may be applied to seismograms in any coordinate system, e.g., common shot point, common receiver point or common midpoint. Interpolation is useful, for example, when certain traces are missing from the time-offset seismogram, such as because of failures or because it is not possible to position sources and/or transmitters in certain offsets. Interpolating between existing traces can increase the resolution of the seismogram and compensate for missing traces. Interpolation is typically performed during inverse WRT by restoration of the supergather's traces in points (coordinates) that are located between original input traces.

Figure 16A:
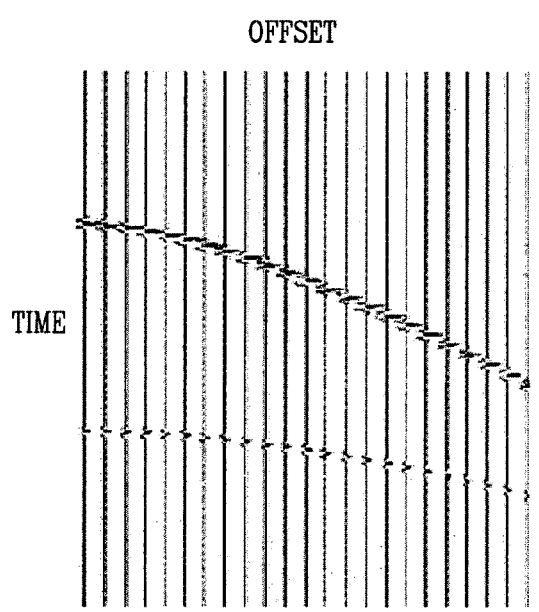
FIGS. 16A and 16B are simulated seismic images showing a method for trace interpolation using WRT, in accordance with an embodiment of the present invention.
Figure 16B:
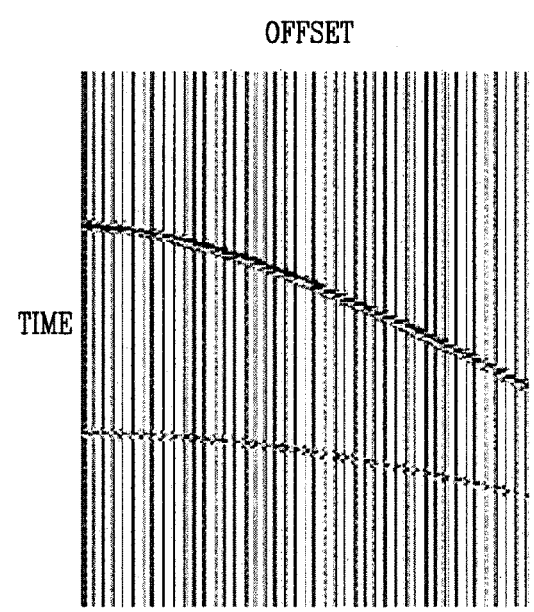

FIGS. 16A and 16B are simulated seismic images showing a method for trace interpolation using WRT, in accordance with an embodiment of the present invention. FIG. 16A shows an original seismogram, which comprises twenty-three traces. FIG. 16B shows a reconstructed seismogram, after WRT and inverse WRT. The reconstructed seismogram has a finer offset resolution and comprises forty-five traces.

Wave Decomposition Using WRT

Processing in the WRT domain can be used to decompose the seismic waves based on various parameters. For example, since R depends on $V_{st}$, it can be used for velocity discrimination. Discrimination on the basis of velocity was used in the examples of FIGS. 13A-13C above to differentiate between primary and multiple reflections. Additionally or alternatively, discrimination can also be performed based on β (see, for example, FIG. 9E above), or based on both R and β.

FIGS. 17A-17C are simulated seismic images showing a method for wave decomposition using WRT, in accordance with an embodiment of the present invention. FIG. 17A shows a projection of the WRT domain onto the β-τ plane (after integration over the R axis). A discrimination line 130 is used for discrimination based on both β and τ. FIG. 17B shows a reconstructed seismogram, which is produced by muting the region below line 130. FIG. 17C shows a reconstructed seismogram, which is produced by muting the region above line 130. As can be seen clearly in the figures, FIGS. 17B and 17C show distinctly different seismic events, which are effectively discriminated in the WRT domain based on both β and τ.

Velocity Analysis

Processing in the WRT domain can be used for performing velocity analysis, e.g., compensating for differences in velocities of the seismic waves. Velocity compensation is useful, for example, for aligning different traces in the output supergather based on wave velocity, so as to perform optimal stacking of the traces. For example, processor 36 may calculate a projection of the WRT volume onto the τ-R plane, by integrating over the β axis, in order to obtain velocity data.

Filtering

Processor 36 may perform different types of filtering operations on the WRT (e.g., $u(\tau,\beta,R)$) volume, or at least some of the volume. Such filtering operations may comprise bandpass filtering, deconvolution filtering for compensating for distortion caused by the Radon transform, compression filtering for localizing the energy of the reflected seismic waves (e.g., for proper implementation of the inverse transform), and/or any other suitable filtering operation.

Migration

Migration of seismic data is a well-known methodology, in which the collected data is corrected to account for dipping events, i.e., geophysical layers that are not flat. In some embodiments, migration may be applied to the improved supergather, following direct and inverse WRT transformation. In these embodiments, it is sometimes possible to make use of the apparent dips on the improved supergather in order to establish the true locations of subsurface reflections. Such a process may require knowledge of the subsurface velocity distributions. For subterranean media having constant velocity, migration may be applied by simple trigonometric calculations. In higher-complexity scenarios, however, migration calculations depend on the subsurface velocity-depth model.

Thus, in some embodiments, signal processor 36 performs migration in the WRT domain, i.e., applies migration to the multi-dimensional data array defined by the wavefront parameters, after direct WRT transformation and prior to inverse WRT transformation. For example, migration can be applied in the 3-D WRT representation $u(\tau,\beta,R)$, described above, although the methods are applicable to any other form of WRT domain. In some embodiments, each point of the subterranean region in question is assumed to be a source of diffracted waves, which extend from the point in all directions.

Processor 36 calculates the different $u(\tau,\beta,R)$ cubes for all central points along the seismic profile using direct WRT. Then, the signal processor defines a sliding window that spans N cubes along the seismic profile, and applies migration corrections using this window. The correction may use any suitable model or formula. For example, some formulas describe the behavior of diffraction wave arrivals to the surface. Such formulas typically depend on $V_{st}$ and on the positions of the different samples in the N cubes of the sliding window. An exemplary formula is described in U.S. patent application Ser. No. 11/900,243, cited above.

Processor 36 computes a corrected WRT-domain cube for each N input cubes. The corrected cubes are then transformed to the time-offset domain using inverse WRT transformation, as described above. Alternatively, processor 36 may use any other suitable technique for performing migration in the WRT domain.

Although the embodiments described hereinabove refer specifically to processing of seismic data and imaging of subsurface structures, the principles of the present invention may similarly be applied in imaging of inhomogeneous media of other sorts, such as in tomography and other techniques of non-destructive testing. The parameters that are defined above for use in processing of seismic data may also be applied in seismic tomography, Amplitude Versus Offset (AVO) methods, static correction (correction of the shallow subsurface influence), Deep Moveout (DMO) processing, etc. Various kinds of data preprocessing may be carried out in the WRT domain, such as muting, subtraction, filtering, deconvolution, normalization and many others.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computer-implemented method for processing data, comprising:
    accepting, by a computer, a first collection of traces corresponding to signals received over time due to reflection of seismic waves from subsurface structures;
    defining, by the computer, a Radon transform having a summation path which is a function of at least three parameters, including a plurality of wavefront parameters of the seismic waves;
    applying the Radon transform to the first collection of traces, for a plurality of values of each of the at least three parameters, so as to convert the first collection into a multidimensional data array, of at least three dimensions, each point in the multidimensional data array is defined as a function of at least three wavefront parameters;
    processing the multidimensional data array, so as to produce a second collection of traces having an improved imaging quality with respect to the first collection;
    wherein the wavefront parameters comprise an angular parameter and at least one radius of curvature of a wavefront outgoing from a subsurface reflector, and
    wherein the angular parameter comprises an emergence angle, and wherein the at least one radius of curvature comprises respective radii of a common reflected element and a common evolute element of the wavefront.

2. The method according to claim 1, wherein the multidimensional data array comprises three or more dimensions corresponding to the at least two of the wavefront parameters and to a propagation time of the seismic waves.

3. The method according to claim 1, wherein processing the multidimensional data array comprises correcting distortion that is introduced into the multidimensional data array by application of the Radon transform.

4. The method according to claim 3, wherein correcting the distortion comprises transforming the multidimensional data array to a frequency domain, and correcting the distortion in the frequency domain.

5. The method according to claim 3, wherein correcting the distortion comprises correcting the distortion in a time domain.

6. The method according to claim 3, wherein correcting the distortion comprises applying an iterative correction process to the multidimensional data array.

7. The method according to claim 1, wherein processing the multidimensional data array comprises differentiating between first and second seismic events that are transformed to respective, different first and second locations in the multidimensional data array.

8. The method according to claim 7, wherein differentiating between the first and second seismic events comprises muting one of the first and second locations in the multidimensional data array.

9. The method according to claim 7, wherein the first seismic event is caused by a single reflection and wherein the second seismic event is caused by multiple reflections.

10. The method according to claim 7, wherein differentiating between the first and second seismic events comprises specifying the first and second locations in the multidimensional data array as a function of the at least two wavefront parameters.

11. The method according to claim 1, wherein processing the multidimensional data array comprises filtering at least some of the data in the array.

12. The method according to claim 1, wherein processing the multidimensional data array comprises interpolating the data in the multidimensional data array, so as to increase a number of the traces in the second collection relative to the first collection.

13. The method according to claim 1, wherein processing the multidimensional data array comprises compensating for differences in respective velocities of the seismic waves.

14. The method according to claim 1, wherein processing the multidimensional data array comprises applying a migration correction to the multidimensional data array.

15. The method according to claim 1, wherein processing the multidimensional data array comprises applying an inverse of the Radon transform to the processed multidimensional data array, so as to produce the second collection of traces.

16. The method according to claim 1, wherein accepting the first collection of traces comprises accepting a first collection of traces including traces belonging to both common shot gathers and common receive gathers.

17. The method according to claim 1, wherein accepting the first collection of traces comprises accepting a collection of traces including all the traces in a given zone.

18. The method according to claim 1, wherein accepting the first collection of traces comprises accepting a collection of traces including all the traces in a first Fresnel zone around a given point.

19. The method according to claim 1, wherein applying the Radon transform to the first collection of traces comprises applying the Radon transform to an arbitrary, unsorted collection of traces.

20. The method according to claim 1, wherein applying the Radon transform to the first collection of traces comprises applying a Radon transform having an inverse transform which allows returning to the first data collection from the multidimensional data array.

21. The method according to claim 1, comprising processing the second collection of traces to generate a seismic image of the subsurface structures at the improved imaging quality.

22. The method according to claim 21, wherein applying the transform, processing the multidimensional data array and processing the second collection are performed irrespective of first locations at which the seismic waves were produced, of second locations at which the signals were received and of mid-points between the first and second locations.

23. The method according to claim 21, wherein processing the second collection comprises integrating the traces in the second collection to produce a composite trace representing the subsurface structures.

24. An apparatus for processing data, comprising:
an interface, which is coupled to accept a first collection of traces corresponding to signals received over time due to reflection of seismic waves from subsurface structures; and a signal processor, which is configured to define a Radon transform having a summation path which is a function of at least three parameters, including a plurality of wavefront parameters of the seismic waves, to apply the Radon transform to the first collection of traces, for a plurality of values of the at least three parameters, so as to convert the first collection into a multidimensional data array of at least three dimensions, that is defined as a function of the at least three parameters, and to process the multidimensional data array so as to produce a second collection of traces having an improved imaging quality with respect to the first collection,
wherein the wavefront parameters comprise an angular parameter and at least one radius of curvature of a wavefront outgoing from a subsurface reflector, and
wherein the angular parameter comprises an emergence angle, and wherein the at least one radius of curvature comprises respective radii of a common reflected element and a common evolute element of the wavefront.

25. The apparatus according to claim 24, wherein the multidimensional data array comprises three or more dimensions corresponding to the at least two of the wavefront parameters and to a propagation time of the seismic waves.

26. The apparatus according to claim 24, wherein the signal processor is configured to correct distortion that is introduced into the multidimensional data array by application of the Radon transform.

27. The apparatus according to claim 26, wherein the signal processor is configured to transform the multidimensional data array to a frequency domain, and to correct the distortion in the frequency domain.

28. The apparatus according to claim 26, wherein the signal processor is configured to correct the distortion in a time domain.

29. The apparatus according to claim 26, wherein the signal processor is configured to correct the distortion by applying an iterative correction process to the multidimensional data array.

30. The apparatus according to claim 24, wherein the signal processor is configured to differentiate between first and second seismic events that are transformed to respective, different first and second locations in the multidimensional data array.

31. The apparatus according to claim 30, wherein the signal processor is configured to mute one of the first and second locations in the multidimensional data array.

32. The apparatus according to claim 30, wherein the first seismic event is caused by a single reflection and wherein the second seismic event is caused by multiple reflections.

33. The apparatus according to claim 30, wherein the signal processor is configured to specify the first and second locations in the multidimensional data array as a function of the at least two wavefront parameters.

34. The apparatus according to claim 24, wherein the signal processor is configured to filter at least some of the data in the array.

35. The apparatus according to claim 24, wherein the signal processor is configured to interpolate the data in the multidimensional data array, so as to increase a number of the traces in the second collection relative to the first collection.

36. The apparatus according to claim 24, wherein the signal processor is configured to compensate for differences in respective velocities of the seismic waves by processing the multidimensional data array.

37. The apparatus according to claim 24, wherein the signal processor is configured to apply a migration correction to the multidimensional data array.

38. The apparatus according to claim 24, wherein the signal processor is configured to integrate the traces in the second collection to produce a composite trace representing the subsurface structures.

39. The apparatus according to claim 24, wherein the signal processor is configured to apply an inverse of the Radon transform to the processed multidimensional data array, so as to produce the second collection of traces.

40. The apparatus of claim 24, wherein the signal processor is further configured to process the second collection of traces to generate a seismic image of the subsurface structures at the improved imaging quality.

41. The apparatus according to claim 40, wherein the signal processor is configured to apply the transform, process the multidimensional data array and process the second collection irrespective of first locations at which the seismic waves were produced, of second locations at which the signals were received and of mid-points between the first and second locations.

42. A computer software product, comprising a non-transitory computer-readable medium in which program instructions are stored, which instructions, when read by a computer, cause the computer to accept a first collection of traces corresponding to signals received over time due to reflection of seismic waves from subsurface structures, to define a Radon transform having a summation path which is a function of at least three parameters, including a plurality of wavefront parameters of the seismic waves, to apply the Radon transform to the first collection of traces, for a plurality of values of each of the at least three parameters, so as to convert the first collection into a multidimensional data array of at least three dimensions that is defined as a function of at least three wavefront parameters, to process the multidimensional data array and re-convert the processed multidimensional data array, so as to produce a second collection of traces having an improved imaging quality with respect to the first collection, and to process the second collection of traces to generate a seismic image of the subsurface structures at the improved imaging quality;
wherein the wavefront parameters comprise an angular parameter and at least one radius of curvature of a wavefront outgoing from a subsurface reflector, and
wherein the angular parameter comprises an emergence angle, and wherein the at least one radius of curvature comprises respective radii of a common reflected element and a common evolute element of the wavefront.

* * * * *